us008562015B2

United States Patent
Yamamoto

(10) Patent No.: US 8,562,015 B2
(45) Date of Patent: Oct. 22, 2013

(54) VEHICLE SIDE AIRBAG DEVICE

(75) Inventor: Kazuhito Yamamoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/641,820

(22) PCT Filed: Apr. 23, 2010

(86) PCT No.: PCT/JP2010/057275
§ 371 (c)(1),
(2), (4) Date: Oct. 17, 2012

(87) PCT Pub. No.: WO2011/132316
PCT Pub. Date: Oct. 27, 2011

(65) Prior Publication Data
US 2013/0033022 A1 Feb. 7, 2013

(51) Int. Cl.
*B60R 21/207* (2006.01)
*B60R 21/233* (2006.01)

(52) U.S. Cl.
USPC .................. 280/729; 280/730.2; 280/742

(58) Field of Classification Search
CPC B60R 21/207; B60R 21/233; B60R 21/2346; B60R 2021/23316
USPC ............. 280/729, 730.2, 740, 742, 743.1
See application file for complete search history.

(56) References Cited

U.S. PATENT DOCUMENTS

| | | | |
|---|---|---|---|
| 7,607,682 B2 * | 10/2009 | Kurimoto et al. ............. | 280/729 |
| 2005/0006883 A1 | 1/2005 | Sato et al. | |
| 2005/0189742 A1 | 9/2005 | Kumagai et al. | |
| 2006/0001244 A1 | 1/2006 | Taguchi et al. | |
| 2006/0071458 A1 | 4/2006 | Sendelbach et al. | |
| 2007/0284859 A1* | 12/2007 | Kashiwagi ................ | 280/730.2 |
| 2009/0020987 A1 | 1/2009 | Wipasuramonton et al. | |
| 2009/0026743 A1* | 1/2009 | Arez ............................. | 280/740 |
| 2010/0181749 A1 | 7/2010 | Sugimoto | |
| 2011/0285119 A1* | 11/2011 | Yamamoto et al. ........ | 280/743.2 |
| 2012/0248746 A1 | 10/2012 | Yamamoto | |

FOREIGN PATENT DOCUMENTS

| | | |
|---|---|---|
| JP | U-05-042001 | 6/1993 |
| JP | A-2004-256017 | 9/2004 |
| JP | A-2004-268682 | 9/2004 |
| JP | A-2005-082068 | 3/2005 |
| JP | A-2005-531451 | 10/2005 |
| JP | A-2006-008017 | 1/2006 |
| JP | A-2007-308122 | 11/2007 |
| JP | A-2007-314076 | 12/2007 |
| JP | A-2009-023640 | 2/2009 |
| JP | A-2010-076711 | 4/2010 |
| JP | A-2010-163142 | 7/2010 |
| WO | WO 2011/077510 A1 | 6/2011 |

* cited by examiner

*Primary Examiner* — Joseph Rocca
(74) *Attorney, Agent, or Firm* — Oliff & Berridge, PLC

(57) ABSTRACT

A side airbag with interior partitioned into plural chambers. The side airbag configured in a bag shape by an outer cloth and an inner cloth is partitioned by partitioning members into a lower chamber (one or more high pressure chambers) on the high pressure side during inflation and deployment and a upper chamber (low pressure chamber). The partitioning members are each configured from a single piece of cloth or from plural pieces of cloth that have been integrated together in advance. The partitioning members are each provided with a partitioning wall, a diffuser and a non-return valve.

6 Claims, 27 Drawing Sheets he present invention relates to a vehicle side airbag device.

VEHICLE SIDE AIRBAG DEVICE

TECHNICAL FIELD

The present invention relates to a vehicle side airbag device.

BACKGROUND ART

In side-on collision airbag devices, structures have been disclosed wherein the airbag interior is partitioned by a seam into a lower chamber and an upper chamber, and a gas distributor (diffuser) is provided to a separated portion between a rear end of the seam and a rear edge of the airbag (see Japanese Patent Application Laid-Open (JP-A) No. 2004-268682). This gas distributor is configured in a tube shape from heat-resistant fabric, and is disposed such that its length direction is aligned with the top-bottom direction. A lower portion of the gas distributor is configured as a non-return valve so as to prevent gas from flowing from the bottom chamber towards the top chamber.

DISCLOSURE OF INVENTION

Technical Problem

However, in the known example above, the gas distributor (diffuser) is configured as a separate body from the cloth of the airbag, complicating the configuration and increasing the length of stitching to manufacture the side airbag. It is therefore considered that there is room for improvement from the perspectives of simplifying the configuration and reducing cost.

In consideration of the above circumstances, the present invention is directed towards achieving a simplified configuration and reduction of cost in a side airbag with interior partitioned into plural chambers.

Solution to Problem

A first aspect of the present invention is a vehicle side airbag device comprising: a side airbag configured in a bag shape by an outer cloth positioned at a vehicle width direction outside and an inner cloth positioned at a vehicle width direction inside, the side airbag comprising one or more high pressure chambers on a high pressure side during inflation and deployment and a low pressure chamber that is at lower pressure than the one or more high pressure chambers during inflation and deployment, the side airbag inflating and deploying to the side of an occupant seated in a vehicle seat when a side-on collision occurs; an inflator that ejects inflation gas from a gas ejection section and supplies the gas into the side airbag during a side-on collision; and a partitioning member that is provided between the outer cloth and the inner cloth, is configured by a single piece of cloth or by plural pieces of cloth that have been integrated together in advance, and comprises a partitioning wall that partitions between the one or more high pressure chambers and the low pressure chamber, a diffuser that mainly distributes gas ejected from the gas ejection section of the inflator to the high pressure chamber side and also distributes gas to the low pressure chamber side, and a non-return valve that permits gas to flow from the low pressure chamber side to the high pressure chamber side and restricts gas from flowing in a reverse direction.

In the vehicle side airbag device according to the first aspect, the side airbag configured as a bag shape by the outer cloth and the inner cloth comprises one or more high pressure chambers on the high pressure side during inflation and deployment and the low pressure chamber that is at lower pressure than the one or more high pressure chambers during inflation and deployment. The one or more high pressure chamber and the low pressure chamber are partitioned from each other by the partitioning wall of the partitioning member provided between the outer cloth and the inner cloth. The partitioning member is configured by a single piece of cloth or by plural pieces of cloth that have been integrated together in advance, and includes the partitioning wall, the diffuser and the non-return valve. A simplified configuration and reduction of cost can thereby be achieved in a side airbag with interior partitioned into plural chambers.

The internal pressure of the one or more high pressure chambers can also be maintained by the non-return valve. However, since the non-return valve is provided as a part region of the partitioning member, the cost required for stitching the side airbag can be reduced in comparison to a structure in which a non-return valve is separately provided, and a more compact and lighter package can be achieved for the folded side airbag.

The inflator is actuated during a side-on collision, and inflation gas is ejected from the gas ejection section of the inflator. The gas is distributed to the high pressure chamber and the low pressure chamber by the diffuser provided to the partitioning member. The gas attempts to flow in reverse from the high pressure chamber side to the low pressure chamber side when ejection of gas from the inflator has ended. However the non-return valve provided to the partitioning member restricts such a flow of gas, and the internal pressure of the high pressure chamber can be maintained in a high pressure state over a long duration of time.

A second aspect of the present invention is the vehicle side airbag device according to the first aspect, wherein: the partitioning member is configured by the single piece of cloth; the partitioning wall is positioned at a vehicle seat front side of the partitioning member and is formed by folding so as to project towards the low pressure chamber side or towards the high pressure chamber side; the diffuser is positioned at a seat rear side of the partitioning member and is formed by folding to project towards the seat front side so as to extend further to the high pressure chamber side than a height position of the partitioning wall; and the non-return valve is formed as an opening section on the high pressure chamber side of the diffuser and opens and closes according to the flow of gas.

In the vehicle side airbag device according to the second aspect, the partitioning wall, the diffuser and the non-return valve of the partitioning member are configured by folding a single piece of cloth. The number of stitching locations when manufacturing the side airbag can accordingly be reduced and the stitching length can be shortened, enabling the manufacturing cost of the side airbag to be reduced.

A third aspect of the present invention is the vehicle side airbag device according to the second aspect, wherein a pair of rear edges of the diffuser are interposed between a peripheral edge portion of the outer cloth and a peripheral edge portion of the inner cloth and stitched.

In the vehicle side airbag device according to the third aspect, the diffuser is configured in a tube shape by merely configuring the partitioning member with a single piece of cloth. The manufacturing cost of the side airbag can accordingly be reduced.

A fourth aspect of the present invention is the vehicle side airbag device according to the second aspect, wherein a rear edge positioned at the vehicle width direction outside of the diffuser is stitched to a side portion of the outer cloth, and a rear edge positioned at the vehicle width direction inside of the diffuser is stitched to a side portion of the inner cloth.

In the vehicle side airbag device according to the fourth aspect, the pair of rear edges of the diffuser is stitched to the side portions of the outer cloth and the inner cloth. The regions further to the seat rear side than the side portions of the inner cloth and the outer cloth accordingly configure part of the diffuser. The overlapping regions of the diffuser with the outer cloth and the inner cloth can accordingly be made smaller, enabling the side airbag to be made lighter and the folded dimension (the package dimension) of the side airbag to be made smaller.

A fifth aspect of the present invention is the vehicle side airbag device of any one aspect of the first to the fourth aspects, wherein in the inflated and deployed state of the side airbag: the one or more high pressure chambers include a lower chamber aligned with a waist region of the occupant; and the low pressure chamber is an upper chamber aligned with at least one of a chest region or a shoulder region of the occupant.

In the vehicle side airbag device according to the fifth aspect, in the inflated and deployed state of the side airbag, the one or more high pressure chambers include a lower chamber aligned with the waist region of the occupant seated in the vehicle seat and the low pressure chamber is an upper chamber aligned with at least one of the chest region or the shoulder region of the occupant. The lower chamber accordingly obtains a higher pressure than the upper chamber during side airbag inflation and deployment. The waist region of the occupant seated in the vehicle seat can accordingly be restrained by the relatively high pressure lower chamber, and at least one of the chest region or the shoulder region of the occupant can be restrained by the relatively low pressure upper chamber. However, the internal pressure of the lower chamber can be maintained for a long duration using the non-return valve, and so the occupant restraining capability during a side-on collision can be further raised.

A sixth aspect of the present invention is the vehicle side airbag device according to any one aspect of the first to the fourth aspects wherein in the inflated and deployed state of the side airbag: the one or more high pressure chambers include a lower chamber aligned with a waist region of the occupant and an uppermost chamber aligned with a shoulder region of the occupant; and the low pressure chamber is an upper chamber positioned between the uppermost chamber and the lower chamber and is aligned with a chest region of the occupant.

In the vehicle side airbag device according to the sixth aspect, in the inflated and deployed state of the side airbag, the one or more high pressure chambers comprise the lower chamber aligned with the waist region of the occupant seated in the vehicle seat and an uppermost chamber aligned with the shoulder region of the occupant, and the low pressure chamber is an upper chamber positioned between the uppermost chamber and the lower chamber, and is aligned with the chest region of the occupant. The lower chamber and the uppermost chamber accordingly obtain a higher pressure than the upper chamber during side airbag inflation and deployment. The waist region of the occupant seated in the vehicle seat can accordingly be restrained by the relatively high pressure lower chamber, and similarly the shoulder region of the occupant can be restrained by the relatively high pressure uppermost chamber. The chest region of the occupant can also be restrained by the relatively low pressure upper chamber. However, the internal pressure of the lower chamber and the uppermost chamber can be maintained for a long duration using the non-return valve, and so the occupant restraining capability during a side-on collision can be further raised.

A seventh aspect of the present invention is the vehicle side airbag device of any one aspect from the first to the sixth aspects wherein: an insertion hole for inserting the inflator inside the side airbag is provided at a location in the inner cloth overlapping with the diffuser; and the inflator is inserted into the side airbag through the insertion hole, and the inflator is fixed to a seatback frame such that the location of the insertion hole in the inner cloth and the diffuser are nipped between the inflator and the seatback frame of the vehicle seat seatback.

In the seventh aspect of the vehicle side airbag device, the inflator can be inserted inside the side airbag through the insertion hole in the inner cloth. The insertion hole is provided at a location in the inner cloth that overlaps with the diffuser. The location of the insertion hole in the inner cloth is nipped together with the diffuser between the inflator and the seatback frame. Gas can accordingly be suppressed from flowing out to outside the side airbag through the insertion hole during inflator actuation using a simple configuration.

Advantageous Effects of Invention

As explained above, according to the vehicle side airbag device of the first aspect of the present invention, the excellent advantageous effect is exhibited of achieving a simplified configuration and a reduction in cost for a side airbag with interior partitioned into plural chambers.

According to the vehicle side airbag device of the second aspect of the present invention, the excellent advantageous effect is exhibited of reducing the number of stitching locations when manufacturing the side airbag and the shortening the stitching length, enabling the manufacturing cost of the side airbag to be reduced.

According to the vehicle side airbag device of the third aspect of the present invention, the excellent advantageous effect is exhibited of enabling the manufacturing cost of the side airbag to be reduced.

According to the vehicle side airbag device of the fourth aspect of the present invention, the excellent advantageous effect is exhibited of making the region where the diffuser overlaps with the outer cloth and the inner cloth smaller, enabling the side airbag to be made lighter and the folded dimension (the package dimension) of the side airbag to be made smaller.

According to the vehicle side airbag device of the fifth aspect of the present invention, the excellent advantageous effect is exhibited of enabling the waist region of the occupant seated in the vehicle seat to be restrained by the relatively high pressure lower chamber, and enabling at least one of the chest region or shoulder region of the occupant to be restrained by the relatively low pressure upper chamber.

According to the vehicle side airbag device of the sixth aspect of the present invention, the excellent advantageous effect is exhibited of enabling the waist region of the occupant seated in the vehicle seat to be restrained by the relatively high pressure lower chamber, enabling the shoulder region of the occupant to be similarly restrained by the relatively high pressure uppermost chamber, and enabling the chest region of the occupant to be restrained by the relatively low pressure upper chamber.

According to the vehicle side airbag device of the seventh aspect of the present invention, the excellent advantageous effect is exhibited of enabling the flow of gas through the insertion hole to outside the side airbag during inflator actuation to be suppressed by a simple configuration.

BRIEF DESCRIPTION OF DRAWINGS

FIG. 1 is a side view illustrating a state in which a side airbag has been inflated and deployed to the side of an occupant seated in a vehicle seat.

FIG. 2 is a side view illustrating a vehicle side airbag device.

FIG. 3 is an enlarged cross-section taken on arrows F3-F3 in FIG. 2, illustrating a structure in which the interior of a side airbag is partitioned by partitioning walls into an uppermost chamber, an upper chamber and a lower chamber.

FIG. 4 is an enlarged cross-section taken on arrows F4-F4 in FIG. 2, illustrating a state in which a non-return valve (a first opening portion of a diffuser) in a partitioning member has been opened by pressure of gas ejected from an inflator, and the gas is being supplied to the lower chamber through the first opening portion and supplied to the upper chamber through a second opening portion of the diffuser.

FIG. 5 is an enlarged cross-section taken on arrows F5-F5 in FIG. 2, illustrating a state in which ejection of gas by the inflator has ended, and the non-return valve has closed.

FIG. 6 is a pattern illustrating a single piece of cloth configuring a partitioning member.

FIG. 7 is a perspective view illustrating a partitioning member wherein a partitioning wall, a diffuser and a non-return valve are integrally formed by folding a single piece of cloth.

FIG. 8 is an enlarged cross-section of taken on arrows F8-F8 in FIG. 2, illustrating a structure inside a side airbag at the vicinity of an inflator.

FIG. 9 is a side view illustrating a vehicle side airbag device.

FIG. 10 is a pattern illustrating a single piece of cloth configuring a partitioning member.

FIG. 11 is a perspective view illustrating a partitioning member wherein a partitioning wall, a diffuser and a non-return valve are integrally formed by folding a single piece of cloth.

FIG. 12 is an enlarged cross-section taken on arrows F12-F12 in FIG. 9, illustrating a structure of the vicinity of an inflator inside a side airbag.

FIG. 13 to FIG. 15 are relating to modified examples. FIG. 13 is a pattern relating to modified examples illustrating a single piece of cloth configuring a partitioning member.

FIG. 14 is a perspective view illustrating a folding process of a single piece of cloth.

FIG. 15 is a perspective view illustrating a partitioning member wherein a partitioning wall, a diffuser and a non-return valve are integrally formed by folding a single piece of cloth.

FIG. 16 is a side view illustrating a vehicle side airbag device.

FIG. 17 is a pattern illustrating a single piece of cloth configuring a partitioning member.

FIG. 18 is a perspective view illustrating a partitioning member wherein a partitioning wall, a diffuser and a non-return valve are integrally formed by folding a single piece of cloth.

FIG. 19 is a perspective view illustrating the placement of a partitioning member and an inflator inside a side airbag.

FIG. 20 is an enlarged cross-section taken on arrows F20-F20 in FIG. 16, illustrating a state in which ejection of gas by the inflator has ended, and the non-return valve has closed.

FIG. 21 is an enlarged cross-section taken on arrows F21-F21 in FIG. 16, illustrating a structure inside a side airbag at the vicinity of an inflator.

FIG. 22 is a schematic enlarged side view illustrating a structure at the vicinity of a partitioning member in a side airbag.

FIG. 23 is a perspective view illustrating a partitioning member configured from two pieces of cloth that have been integrated together in advance.

FIG. 24 is an enlarged cross-section taken on arrows F24-F24 in FIG. 22, illustrating a structure in which the interior of a side airbag has been partitioned by a partitioning wall into an upper chamber and a lower chamber.

FIG. 25 is a pattern illustrating a single piece of cloth configuring a partitioning member according to a modified example.

FIG. 26 is a side view illustrating a vehicle side airbag device.

FIG. 27 is a perspective view illustrating a partitioning member.

BEST MODE FOR CARRYING OUT THE INVENTION

Explanation follows regarding exemplary embodiments of the present invention, with reference to the drawings.

First Exemplary Embodiment

Figure 1:
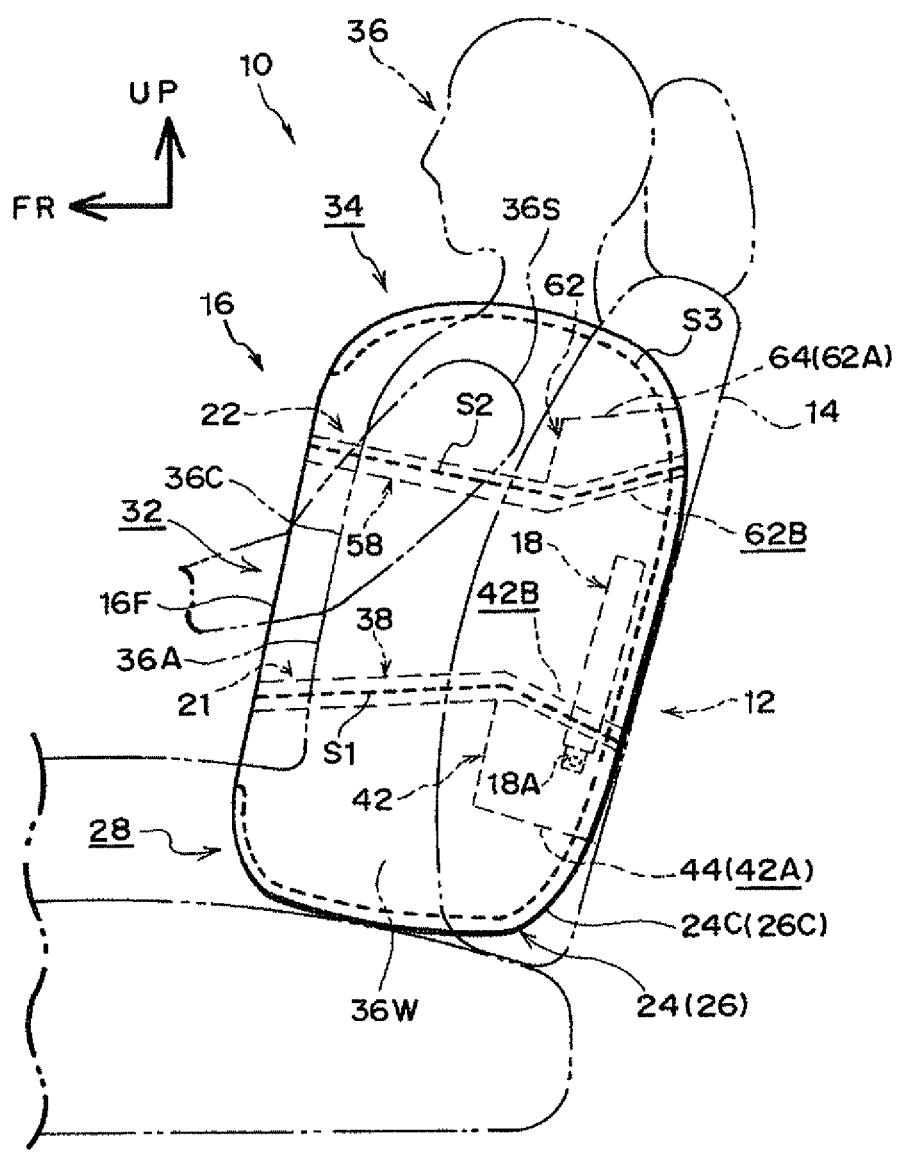
FIG. 1 to FIG. 8 relate to a first exemplary embodiment.
Figure 2:
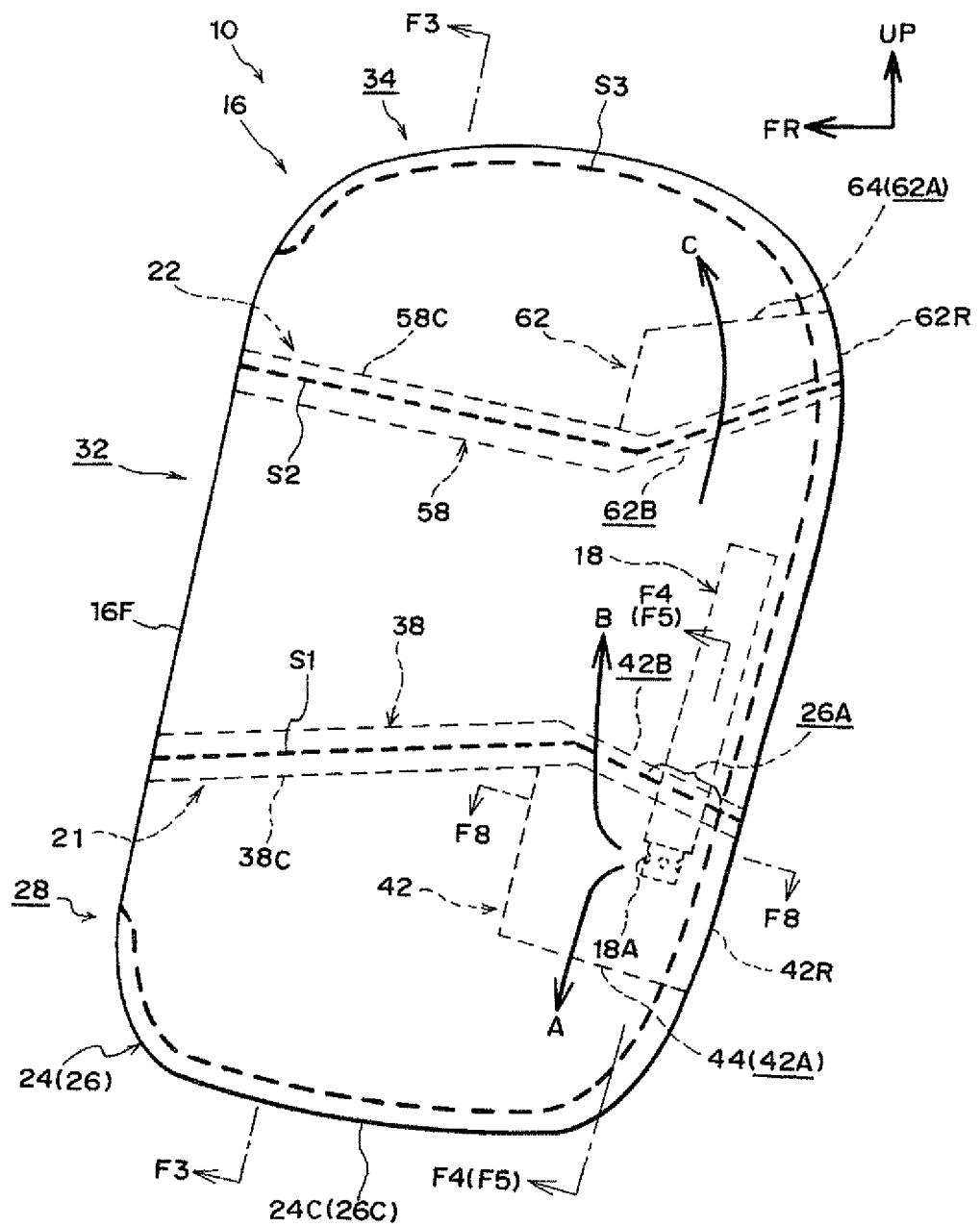

A vehicle side airbag device 10 according to the present exemplary shown in FIG. 1 and FIG. 2 relates, for example, to a side airbag device installed in a side portion of a seatback 14 of a vehicle seat 12. The vehicle side airbag device 10 includes a side airbag 16, an inflator 18, and partitioning members 21, 22.

The side airbag 16 is configured in a bag shape with an outer cloth 24 positioned at a vehicle width direction outside and an inner cloth 26 positioned at a vehicle width direction inside. The inner faces of the outer cloth 24 and the inner cloth 26 may be subjected to coating in order to raise the airtightness of the side airbag 16.

The side airbag 16 includes a lower chamber 28 and an uppermost chamber 34 serving as examples of one or more high pressure chambers configured on the high pressure side during inflation and deployment, and an upper chamber 32 serving as an example of a low pressure chamber that is at a lower pressure than the lower chamber 28 and the uppermost chamber 34 during inflation and deployment. As shown in FIG. 1, the side airbag 16 is configured so as to inflate and deploy to the side of an occupant 36 seated in the vehicle seat 12 during a side-on collision. More specifically, the side airbag 16 is configured to inflate and deploy between the occupant 36 and the vehicle side section (not shown in the drawings) at the side on which the occupant 36 is seated.

When the side airbag 16 is in an inflated and deployed state the lower chamber 28 serving as a high pressure chamber is aligned with a waist region 36W of the occupant 36, and the uppermost chamber 34 that also serves as a high pressure chamber is aligned with a shoulder region 36S of the occupant 36. The upper chamber 32 serving as a low pressure chamber is aligned with a chest region 36C of the occupant 36.

The outer cloth 24 and the inner cloth 26 are formed by folding a piece of left-right symmetrical cloth (not shown in the drawings) in two (a ridge fold) towards the seat rear side of the vehicle seat 12 centered at a position corresponding to a front edge 16F of the side airbag 16. The side airbag 16 is configured, by stitching together a peripheral edge portion 24C of the outer cloth 24 and the peripheral edge portion 26C of the inner cloth 26 (stitched section S3) at locations other than the front edge 16F.

Note that there is no limitation to forming the side airbag 16 by stitching together the peripheral edge portion 24C of the outer cloth 24 and the peripheral edge portion 26C of the inner cloth 26, and the side airbag 16 may for example be formed by bag weaving.

The inflator 18 shown in FIG. 1, FIG. 2, FIG. 4, FIG. 5 and FIG. 8 is, for example, a circular cylinder shaped gas generation source that ejects inflation gas from a gas ejection section 18A during a side-on collision and supplies the gas to inside the side airbag 16. In the side airbag 16 inflated and deployed state, the inflator 18 is positioned inside the side airbag 16 to the seat rear side of the vehicle seat 12, and more specifically is positioned in the vicinity of a seat rear edge portion. The gas ejection section 18A that is provided at one end of the inflator 18 is disposed inside a diffuser 42, described later. The inflator 18 is disposed such that the gas ejection section 18A faces towards the lower chamber 28 side.

Figure 8:
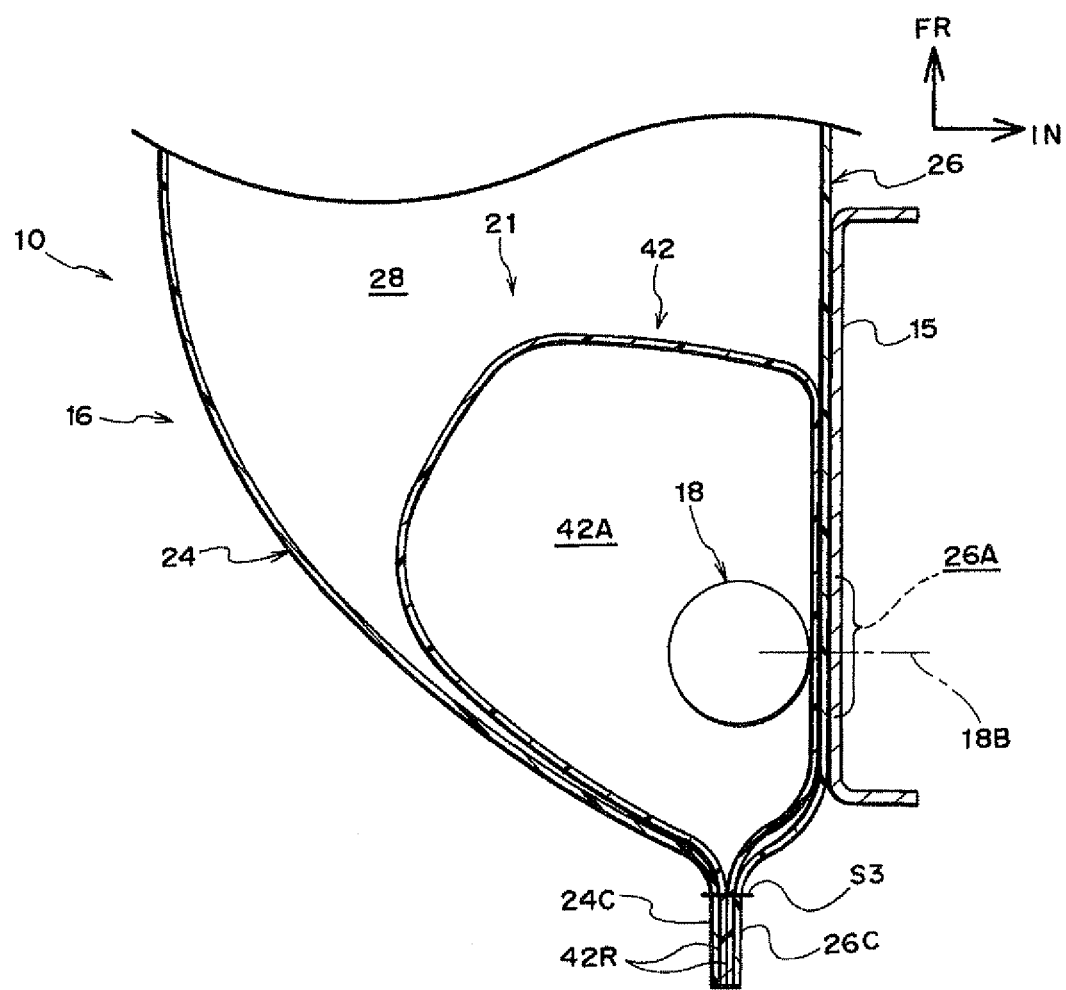

As shown in FIG. 8, an insertion hole 26A for inserting the inflator 18 into the side airbag 16 is provided in the inner cloth 26 at a position overlapping with the diffuser 42. The inflator 18 can accordingly be inserted into the side airbag 16 through the insertion hole 26A of the inner cloth 26. The inflator 18 is inserted from the insertion hole 26A into the side airbag 16, and is fixed to the seatback frame 15 so as to nip the location of the insertion hole 26A of the inner cloth 26 and the diffuser 42 between the inflator 18 and a seatback frame 15 of the seatback 14 of vehicle seat 12.

More specifically, for example, two stud bolts 18B are provided to the inflator 18 so as to extend towards the seat width direction inside. The stud bolts 18B are passed through the diffuser 42, the inner cloth 26 and the seatback frame 15, and the inflator 18 is fixed together with the side airbag 16 to the seatback frame 15 by fastening nuts (not shown in the drawings) onto the stud bolts 18B.

The insertion hole 26A of the inflator 18 is provided at a location in the inner cloth 26 overlapping with the diffuser 42. The location of the insertion hole 26A in the inner cloth 26 is nipped together with the diffuser 42 between the inflator 18 and the seatback frame 15. Gas can accordingly be suppressed from flowing out through the insertion hole 26A to outside of the side airbag 16 when the inflator 18 is actuated using such a simple configuration.

While not illustrated in the drawings, the inflator 18 is connected to an airbag ECU through a wiring harness, and is actuated by an actuation current from the airbag ECU so as to supply inflation gas to the side airbag 16. The airbag ECU is configured to make an actuation current flow to the inflator 18 when a side-on collision is determined from a signal from a collision sensor (not shown in the drawings).

As shown in FIG. 1 and FIG. 2, the partitioning members 21, 22 are provided between the outer cloth 24 and the inner cloth 26 and are each configured from a single piece of cloth 46. The partitioning member 21 is disposed at the boundary between the lower chamber 28 and the upper chamber 32. The partitioning member 22 is disposed at the boundary between the upper chamber 32 and the uppermost chamber 34. The partitioning member 21 is accordingly disposed at the seat top side and the partitioning member 22 is positioned at the seat bottom side.

Figure 3:
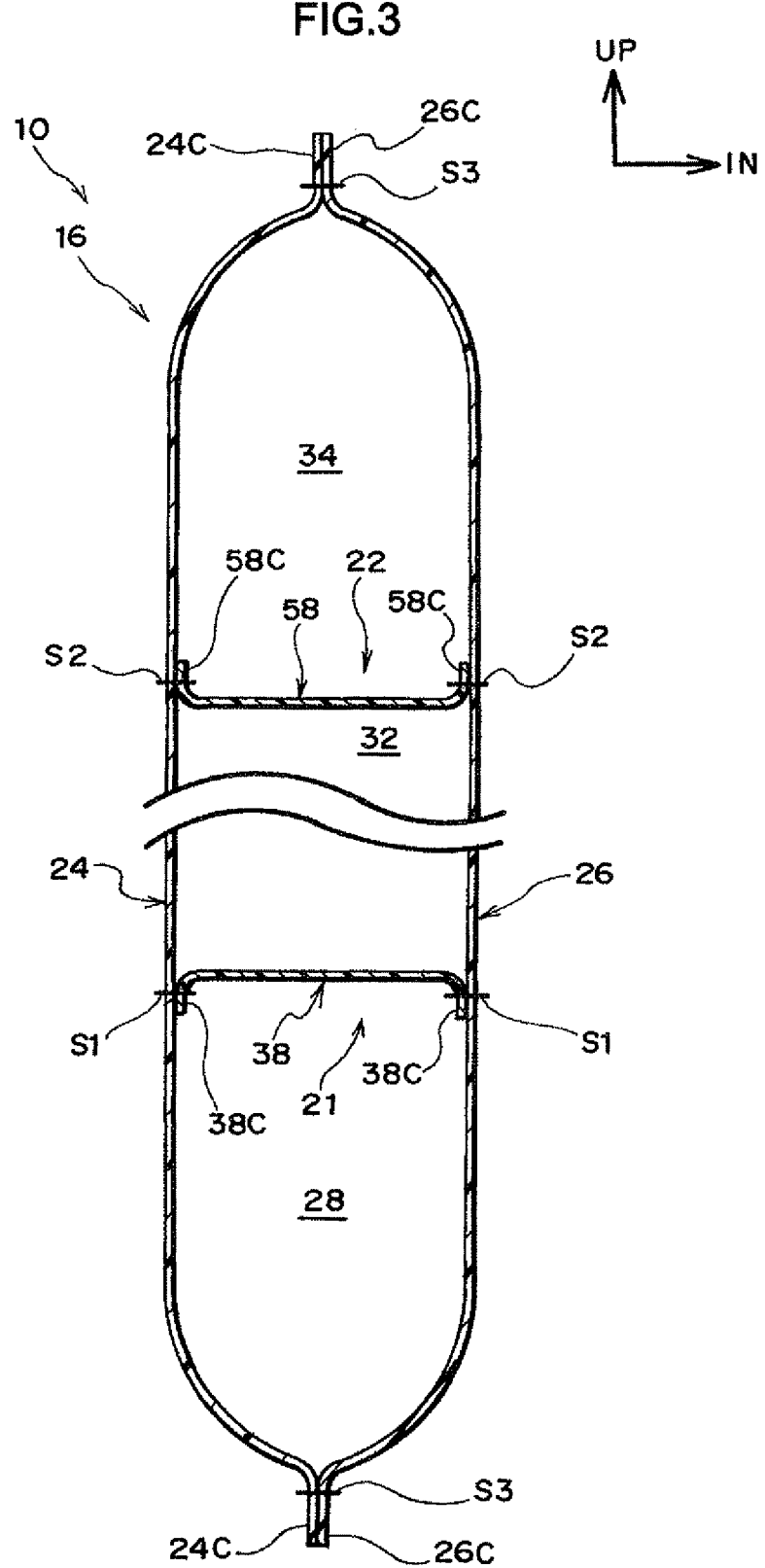

The partitioning member 21 is provided with a partitioning wall 38, the diffuser 42 and a non-return valve 44 integrated together. As shown in FIG. 3, the partitioning wall 38 is positioned so as to partition between the lower chamber 28 serving as a high pressure chamber and the upper chamber 32 serving as a low pressure chamber.

Figure 6:
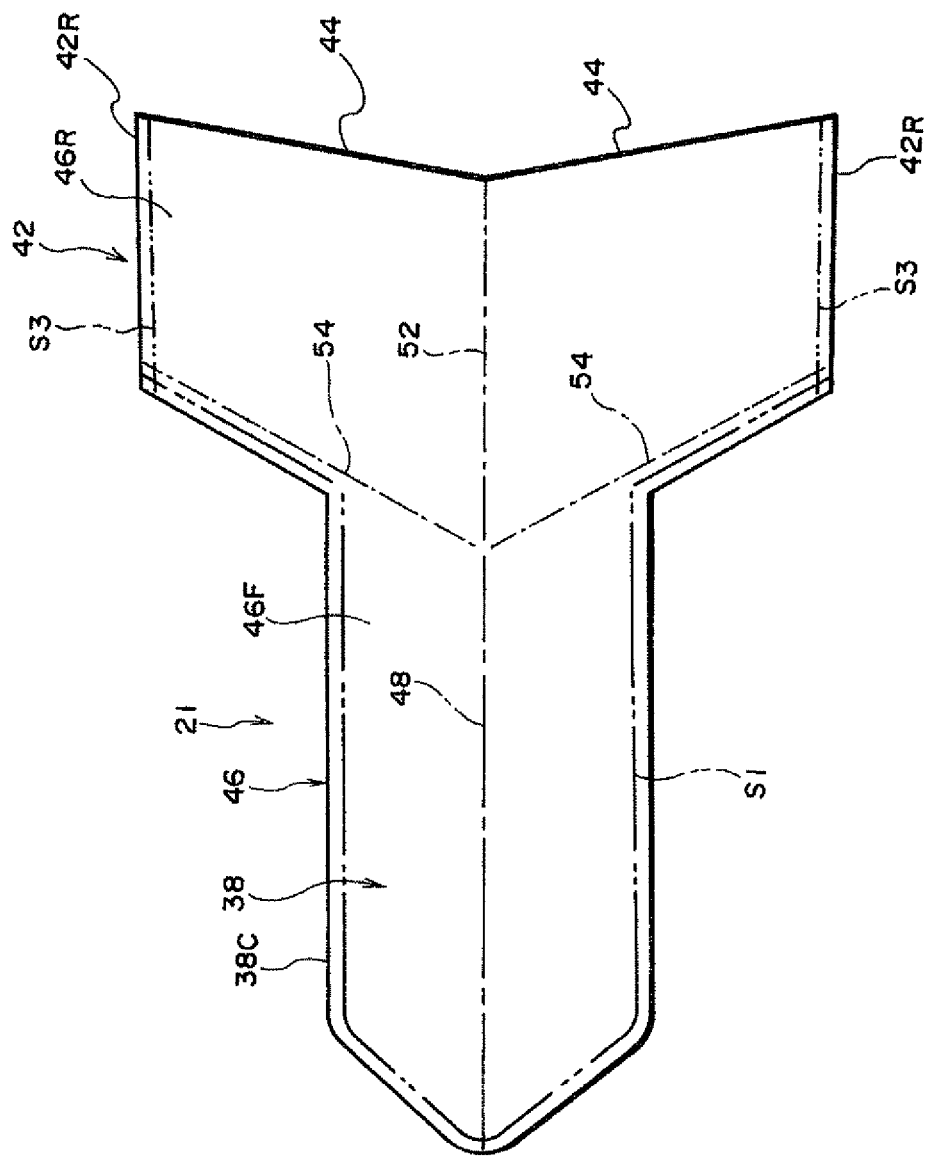
Figure 7:
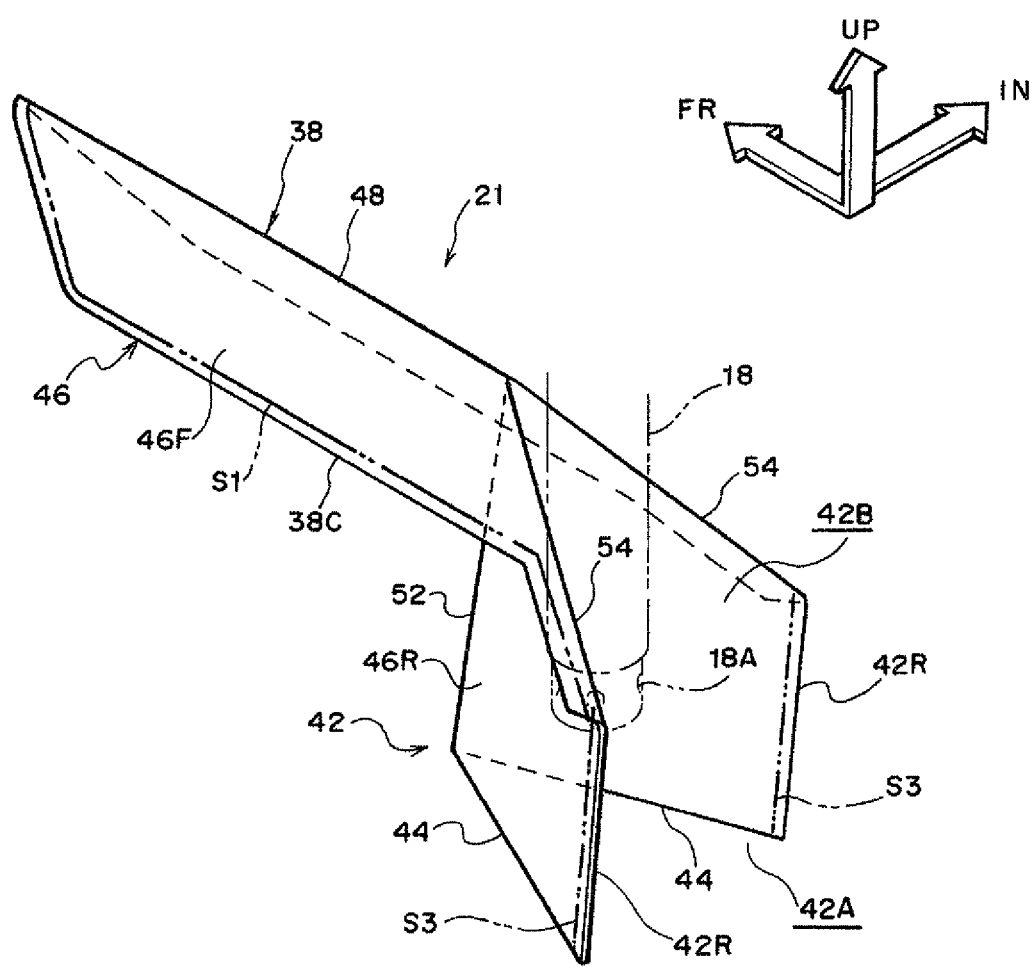

As shown in FIG. 6 and FIG. 7, the partitioning wall 38 in the partitioning member 21 is positioned at a vehicle seat 12 seat front side of the partitioning member 21. The partitioning wall 38 is formed by folding a front region 46F of the single piece of cloth 46 in two (a ridge fold) centered on a fold line 48 so as to project towards the upper chamber 32 side (see FIG. 2), namely towards the seat top side. As shown in FIG. 2 and FIG. 3, the partitioning wall 38 is stitched to the inner faces of the outer cloth 24 and the inner cloth 26 of the side airbag 16 along a peripheral edge portion 38C (stitched section S1).

The diffuser in the partitioning member 21 shown in FIG. 1, FIG. 2, FIG. 4, FIG. 5 and FIG. 8 is formed, for example, in a tube shape projecting out towards the lower chamber 28 side. The diffuser includes a first opening section 42A opening towards the lower chamber 28 side and a second opening section 42B opening towards the upper chamber 32. The diffuser 42 is accordingly rendered capable of mainly distributing gas ejected from the gas ejection section 18A of the inflator 18 towards the lower chamber 28 side, and also capable of distributing gas to the upper chamber 32 side.

The diffuser 42 is positioned at a seat rear side of the partitioning member 21, and is formed by folding to project towards the seat front side, so as to extend further towards the high pressure chamber side partitioned by the partitioning wall 38 than a height position of the partitioning wall 38, namely towards the lower chamber 28 side (see FIG. 2). More specifically, the diffuser 42 is formed by folding a rear section region 46R of the single piece of cloth 46 in two (a valley fold) projecting towards the seat front side centered on a fold line 52, and folding towards the seat bottom side with respect to the front region 46F at the position of a fold line 54 positioned at the boundary of the front region 46F.

As shown in FIG. 6, the width of the rear section region 46R of the single piece of cloth 46 is set larger than the width of the front region 46F. Accordingly, as shown in FIG. 2, a pair of rear edges 42R of the diffuser 42 interposed between the peripheral edge portion 24C and the peripheral edge portion 26C at a position of a region where the peripheral edge portion 24C of the outer cloth 24 and the peripheral edge portion 26C of the inner cloth 26 overlap with each other in side view, as shown in FIG. 8, and then stitched (the stitched section S3).

Figure 4:
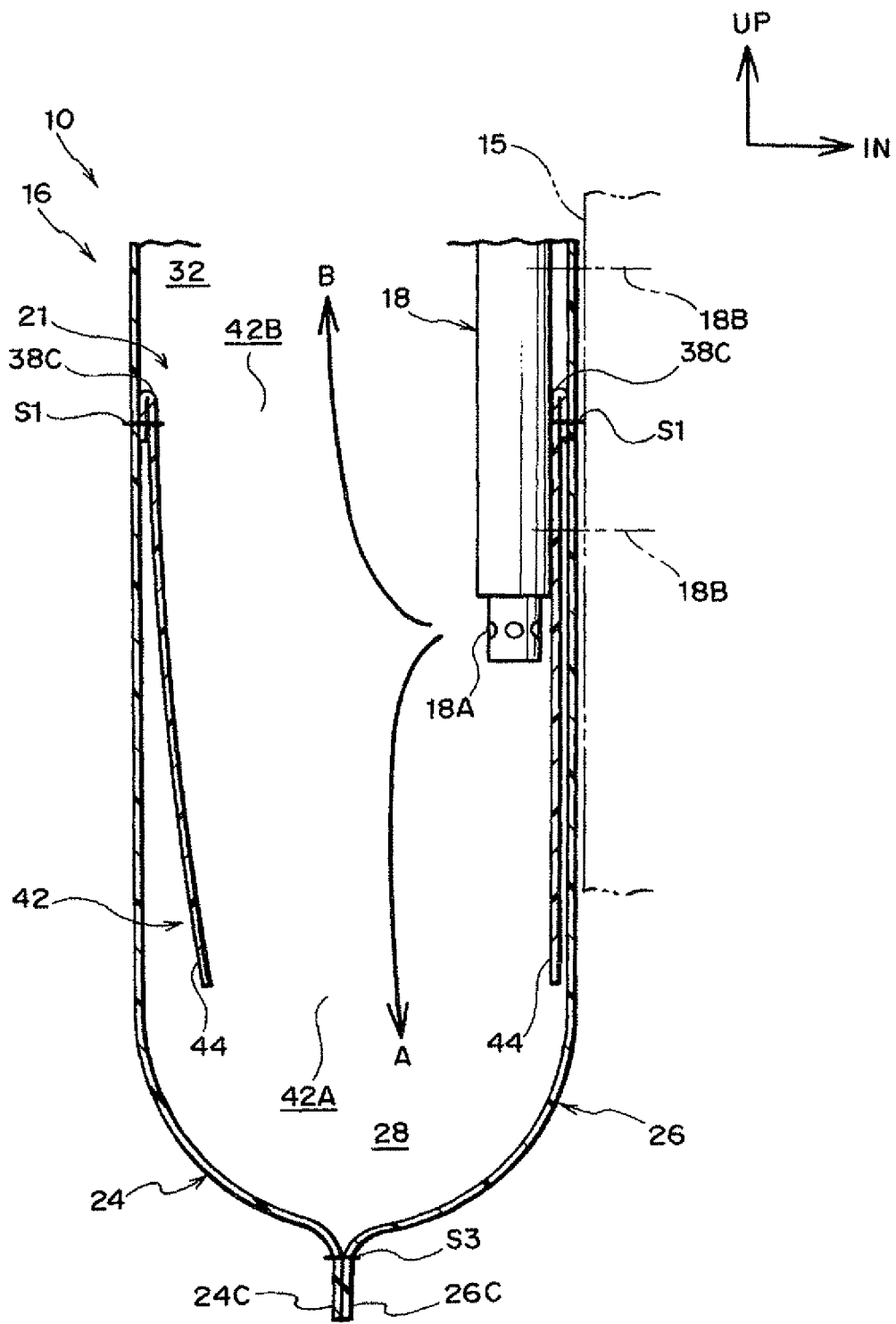
Figure 5:
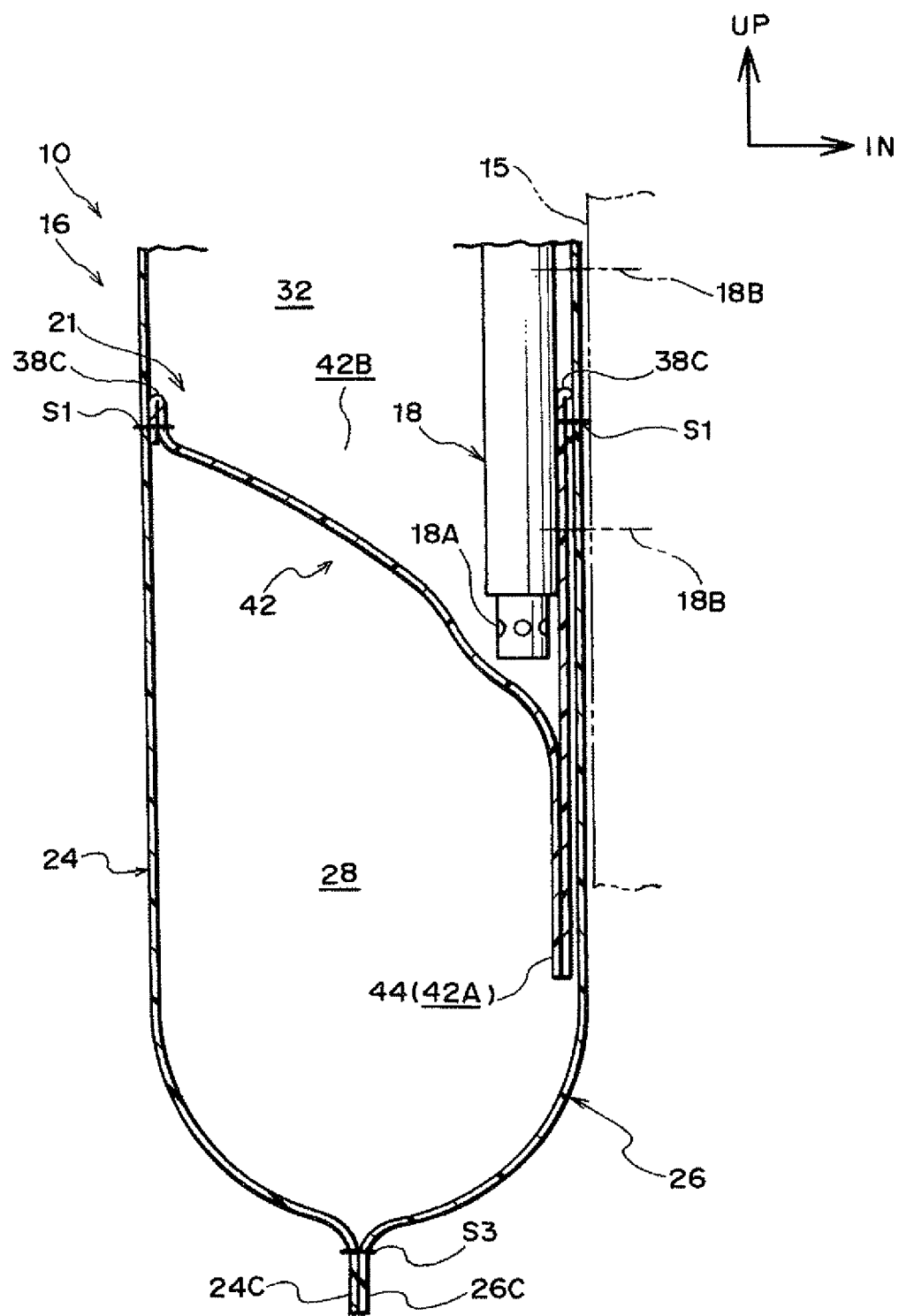

The non-return valve 44 is a location that permits gas ejected from the gas ejection section 18A of the inflator 18 to flow through from the upper chamber 32 side to the lower chamber 28 side (FIG. 4), but restricts gas from flowing in the opposite direction (FIG. 5). The non-return valve 44 is configured by the first opening section 42A, this being an opening section on the lower chamber 28 side of the diffuser 42 that opens and closes according to the gas flow. In other words the diffuser 42 is flexible, and doubles as the non-return valve 44 by opening and closing of the first opening section 42A.

As shown in FIG. 4, the non-return valve 44 (the first opening section 42A of the diffuser 42) is configured to open when the inflator 18 is actuated, due to the pressure of gas ejected from the gas ejection section 18A of the inflator 18. However, as shown in FIG. 5, the non-return valve 44 (the first opening section 42A of the diffuser 42) is configured to be closed by gas attempting to reverse flow from the high pressure chamber lower chamber 28 side to the low pressure chamber upper chamber 32 side when gas ejection from the inflator 18 has ended.

In FIG. 1 to FIG. 3, the structure of the partitioning member 22 positioned at the seat top side is substantially the same as the structure of the partitioning member 21. More specifically, the partitioning wall 58 of the partitioning member 22 is positioned to partition between the uppermost chamber 34 serving as a high pressure chamber and the upper chamber 32 serving as a low pressure chamber, and corresponds to the partitioning wall 38 of the partitioning member 21. As shown in FIG. 2 to FIG. 3, the partitioning wall 58 is stitched at a peripheral edge portion 58C to the inner faces of the outer cloth 24 and the inner cloth 26 of the side airbag 16 (stitched section S2).

As shown in FIG. 2, a diffuser 62 of the partitioning member 22 corresponds to the diffuser 42 of the partitioning member 21. A pair of rear edges 62R of the diffuser 62 are interposed between the peripheral edge portion 24C of the outer cloth 24 and the peripheral edge portion 26C of the inner cloth 26 and then stitched (stitched section S3). The diffuser 62 is thereby formed projecting out towards the uppermost chamber 34 side, for example in a tube shape. The diffuser 62 has a first opening section 62A opening on the uppermost chamber 34 side and a second opening section 6213 opening towards the upper chamber 32. The diffuser 62 is thereby capable of distributing gas supplied from the inflator 18 into the upper chamber 32 through the second opening section 62B and onwards through the first opening section 62A into the uppermost chamber 34.

A non-return valve 64 of the partitioning member 22 is positioned to permit gas inside the upper chamber 32 to flow to the uppermost chamber 34 side and to restrict gas from flowing in the reverse direction, and corresponds to the non-return valve 44 of the partitioning member 21. The non-return valve 64 opens and closes according to the gas flow, and is configured by the first opening section 62A that is an opening section on the uppermost chamber 34 side of the diffuser 62.

Note that, as shown in FIG. 2, unlike the diffuser 42 of the partitioning member 21, the gas ejection section 18A of the inflator 18 is not disposed inside the diffuser 62 of the partitioning member 22, and the diffuser 62 is not located to directly restrict flow of gas ejected from the gas ejection section 18A. The main function of the diffuser 62 is accordingly to restrict the reverse flow of gas from the uppermost chamber 34 side to the upper chamber 32 side using the non-return valve 64 that doubles as the first opening section 62A.

Operation

Explanation follows regarding the operation of the present exemplary embodiment configured as described above. In FIG. 1 to FIG. 3, the vehicle side airbag device 10 of the present exemplary embodiment includes the side airbag 16 configured in a bag shape by the outer cloth 24 and the inner cloth 26. The side airbag 16 includes the lower chamber 28 and the uppermost chamber 34 configuring the high pressure side during inflation and deployment, and the upper chamber 32 that is at a lower pressure than the lower chamber 28 and the uppermost chamber 34. The lower chamber 28 and the upper chamber 32 are partitioned from each other by the partitioning wall 38 of the partitioning member 21 provided between the outer cloth 24 and the inner cloth 26. The upper chamber 32 and the uppermost chamber 34 are similarly partitioned from each other by the partitioning wall 58 of the partitioning member 22 provided between the outer cloth 24 and the inner cloth 26.

The partitioning wall 38, the diffuser 42 and the non-return valve 44 in the partitioning member 21 are formed by folding the single piece of cloth 46. The pair of rear edges 42R of the diffuser 42 are interposed between the peripheral edge portion 24C of the outer cloth 24 and the peripheral edge portion 26C of the inner cloth 26 and then stitched, and the diffuser 42 is configured in a tube shape by the single piece of cloth 46 configuring the partitioning member 21 alone.

The partitioning wall 58, the diffuser 62 and the non-return valve 64 in the partitioning member 22 are also formed by folding a single piece of cloth (not shown in the drawings). The pair of rear edges 62R of the diffuser 62 are interposed between the peripheral edge portion 24C of the outer cloth 24 and the peripheral edge portion 26C of the inner cloth 26 and then stitched, such that the diffuser 62 is configured in a tube shape by the single piece of cloth (not shown in the drawings) configuring the partitioning member 22 alone.

Hence in the present exemplary embodiment, for a side airbag 16 with plural internal partitioned chambers, the number of locations for stitching when manufacturing the side airbag 16 can be reduced, the length of stitching can be shortened, and configuration simplified, thereby enabling the manufacturing cost of the side airbag 16 to be reduced.

The non-return valve 44 which retains the internal pressure of the lower chamber 28 is provided in a part region of the partitioning member 21, and so the cost required for stitching the side airbag 16 can be reduced in comparison to a structure provided with a separate non-return valve. A more compact and lighter package can also be achieved for the folded side airbag 16.

Explanation follows regarding operation of the vehicle side airbag device 10 during a side-on collision. When the airbag ECU determines that a side-on collision has occurred based on a signal from the collision sensor (not shown in the drawings), an actuation current is caused to flow from the airbag ECU to the inflator 18. The inflator 18 actuates on receipt of the actuation current and a great volume of gas is ejected from the gas ejection section 18A.

As shown in FIG. 2 and FIG. 4, the inflation gas is mainly distributed through the first opening section 42A of the diffuser 42 to the lower chamber 28 of the side airbag 16 (the arrow A direction) and is also distributed through the second opening section 42B to the upper chamber 32 (the arrow B direction). The gas distributed to the upper chamber 32 is distributed onwards to the uppermost chamber 34 through the second opening section 62B and the first opening section 62A of the diffuser 62 (the arrow C direction). The side airbag 16 bulges out from the side section of the seatback 14, and inflates and deploys between the vehicle side section (not shown in the drawings) and the occupant 36.

Specifically, in FIG. 2 and FIG. 4, during actuation of the inflator 18, the non-return valve 44 (the first opening section 42A of the diffuser 42) in the partitioning member 21 opens due to the pressure of gas ejected from the gas ejection section 18A of the inflator 18. In FIG. 2, the non-return valve 64 in the partitioning member 22 (the first opening section 62A of the diffuser 62) also opens due to the pressure of gas supplied into the upper chamber 32. Gas is thereby permitted to flow into the lower chamber 28, the upper chamber 32 and the uppermost chamber 34.

As shown in FIG. 5, when ejection of gas from the inflator 18 has ended, and gas attempts to flow in reverse from the high pressure chamber lower chamber 28 side to the low pressure chamber upper chamber 32 side, such a reverse flow of gas is restricted by the non-return valve 44 of the partitioning member 21 closing. The internal pressure of the lower chamber 28 can thereby be maintained for a longer duration.

Furthermore, even if gas attempts to flow in reverse from the high pressure chamber uppermost chamber 34 side to the low pressure chamber upper chamber 32 side, such a reverse flow of gas is restricted by the non-return valve 64 of the partitioning member 22 closing. The internal pressure of the uppermost chamber 34 can thereby be maintained for a longer duration.

During inflation and deployment of the side airbag 16 the lower chamber 28 and the uppermost chamber 34 are at a higher pressure than the upper chamber 32. Therefore, as shown in FIG. 1, the waist region 36W of the occupant 36 seated in the vehicle seat 12 can be restrained by the comparatively high pressure lower chamber 28, and the shoulder region 36S of the occupant 36 can be similarly restrained by the comparatively high pressure uppermost chamber 34. The chest region 36C and the abdominal region 36A of the occupant 36 can be restrained by the comparatively low pressure upper chamber 32. The occupant restraining performance during a side-on collision can be raised due to being able to maintain the internal pressure of the lower chamber 28 and the uppermost chamber 34 by employing the non-return valve 44 and the non-return valve 64. The upper chamber 32 is not only aligned with the chest region 36C of the occupant 36 but also with the abdominal region 36A.

Consequently, according to the vehicle side airbag device 10, each region of the upper body of the occupant 36 can respectively be restrained at an appropriate timing and with an appropriate restraining force for each region, by the side airbag 16 that inflates and deploys between the vehicle side section (not shown in the drawings) and the occupant 36 during a side-on collision.

Second Exemplary Embodiment

Figure 9:
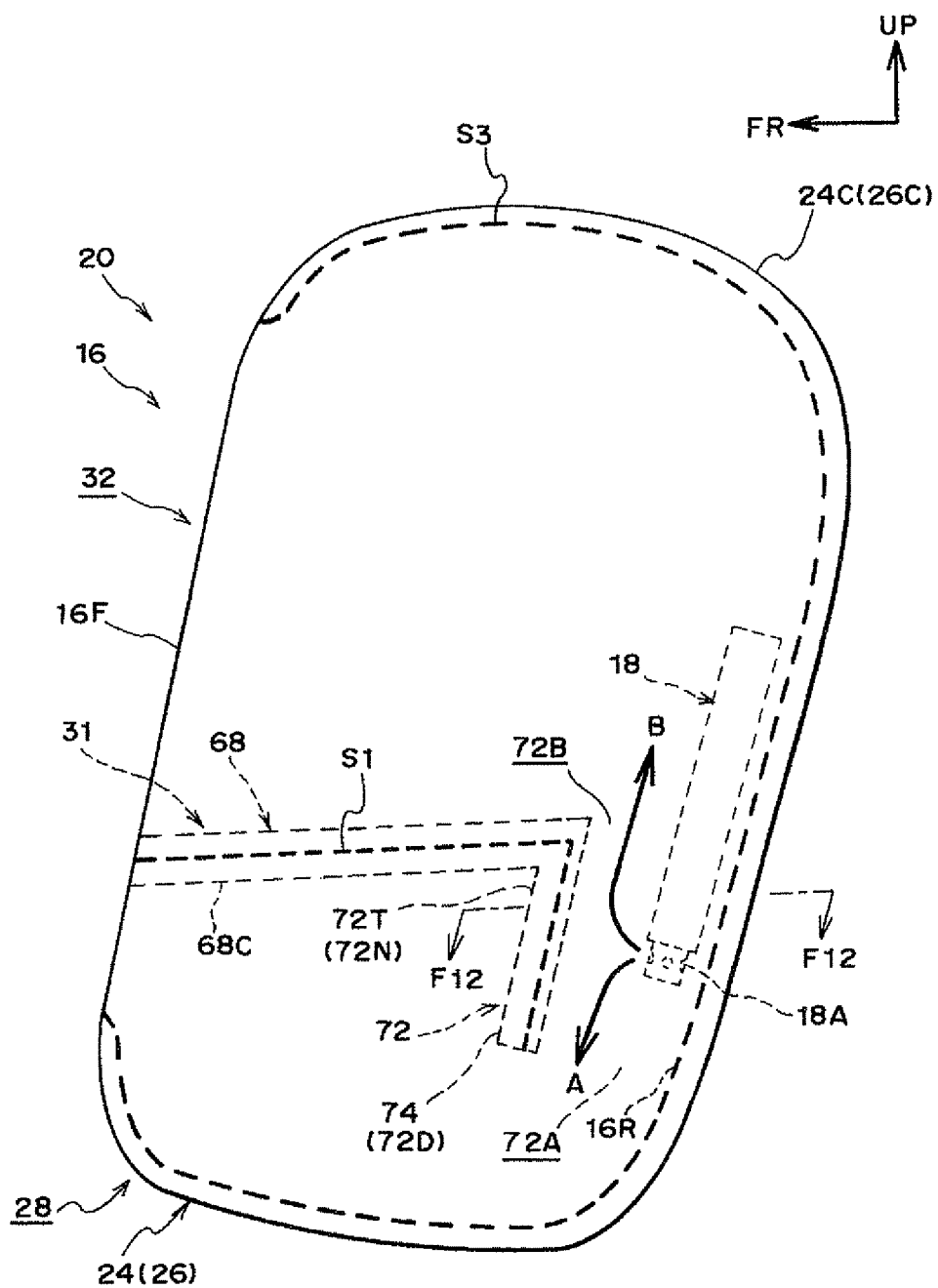
FIG. 9 to FIG. 15 relate to a second exemplary embodiment.

In a vehicle side airbag device 20 according to the present exemplary embodiment illustrated in FIG. 9, in the inflated and deployed state of the side airbag 16, a high pressure chamber is a lower chamber 28 aligned with the waist region 36W (see FIG. 1) of an occupant 36, and a low pressure chamber is an upper chamber 32 aligned with at least one of the chest region 36C or the shoulder region 36S of the occupant 36. In the present exemplary embodiment the upper chamber 32 is aligned with both the chest region 36C and the shoulder region 36S of the occupant 36.

A partitioning member 31 is provided between the outer cloth 24 and the inner cloth 26. The partitioning member 31 is configured by a single piece of cloth 66, and is positioned at the boundary between the lower chamber 28 and the upper chamber 32. The partitioning member 31 is provided with a partitioning wall 68, a diffuser 72 and a non-return valve 74 that are integrated together.

Figure 10:
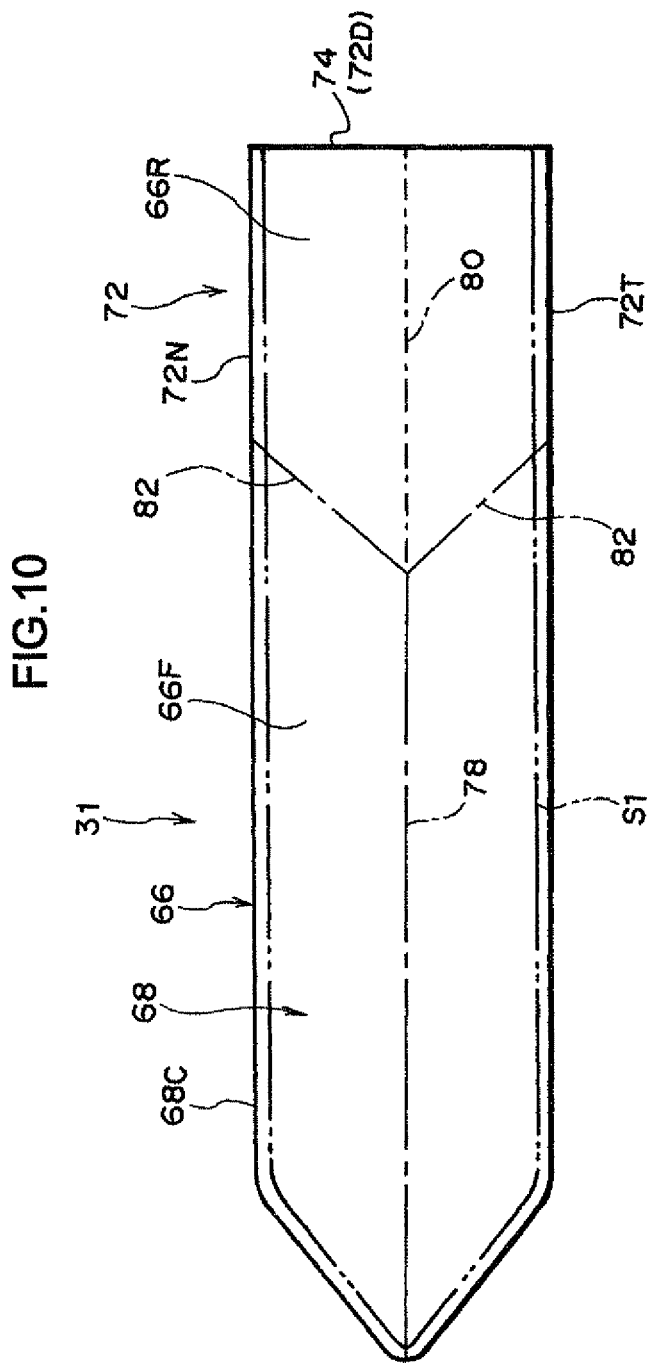
Figure 11:
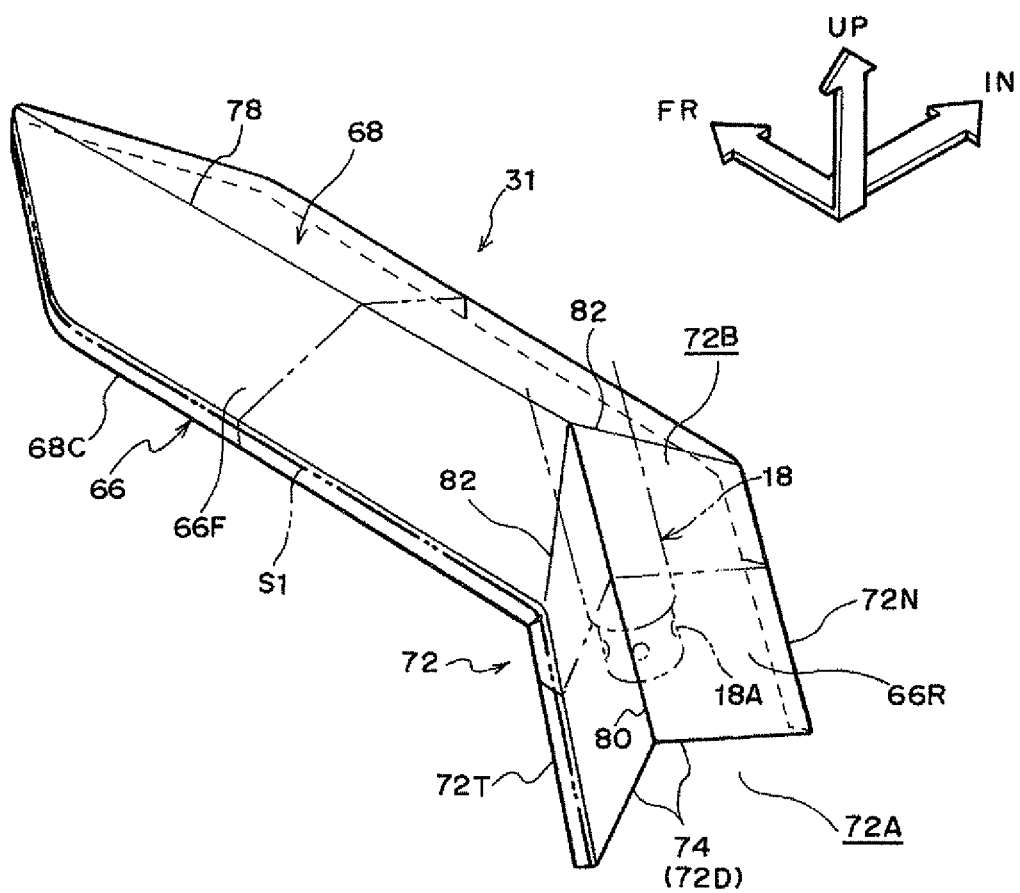

The partitioning wall 68 is positioned to partition between the high pressure chamber lower chamber 28 and the low pressure chamber upper chamber 32, positioned at the seat front side of the partitioning member 31. FIG. 10 and FIG. 11 illustrate the partitioning wall 68 formed by folding a front region 66F of the single piece of cloth 66 in two (a ridge fold) centered on a fold line 78 to as to project up towards the upper chamber 32 side (see FIG. 9), namely towards the seat top side. The partitioning wall 68 is stitched to the inner faces of the outer cloth 24 and the inner cloth 26 of the side airbag 16 at a peripheral edge portion 68C (stitched section S1).

In FIG. 9 to FIG. 12, the diffuser 72 in the partitioning member 31 is formed for example in a tube shape so as to project out towards the lower chamber 28 side. The diffuser 72 includes a first opening section 72A opening towards the lower chamber 28 side and a second opening section 72B opening towards the upper chamber 32. The diffuser 72 is accordingly capable of distributing gas ejected from the gas ejection section 18A of the inflator 18 mainly towards the lower chamber 28 side and also distributing gas towards the upper chamber 32.

The diffuser 72 is positioned at the seat rear side of the partitioning member 31 and is formed by folding to project towards the seat front side, so as to extends further towards the high pressure chamber side partitioned by the partitioning wall 68 than the height position of the partitioning wall 68, namely towards the lower chamber 28 side. More specifically, the diffuser 72 is formed by folding a rear section region 66R of the single piece of cloth 66 in two (a valley fold) so as to project towards the seat front side centered on a fold line 80, and by folding towards the seat bottom side with respect to the front region 66F at the position of a fold line 82 positioned at the boundary of the front region 66F and the rear region 66R.

As shown in FIG. 10, the width of the rear section region 66R of the single piece of cloth 66 is for example equivalent to the width of the front region 66F. Accordingly, as shown in FIG. 9, a rear end 72T positioned on the vehicle width direction outside of the diffuser 72 and a rear end 72N positioned on the vehicle width direction inside of the diffuser 72 do not reach the position of the peripheral edge portion 24C of the outer cloth 24 and the position of the peripheral edge portion 26C of the inner cloth 26 in side view. The rear end 72T positioned at the vehicle width direction outside of the diffuser 72 is accordingly stitched to a side portion of the outer cloth 24 (stitched section S1). The rear end 72N positioned at the vehicle width direction inside of the diffuser 72 is accordingly stitched to a side portion of the inner cloth 26 (stitched section S1). Due to the above configuration, the stitching of the partitioning member 31 to the outer cloth 24 and the inner cloth 26 can accordingly be performed all at once with the stitched section S1.

In the present exemplary embodiment, a region in the outer cloth 24 and the inner cloth 26 to the seat rear side of the side portion where the stitched section S1 is positioned also configures a portion of the diffuser 72. Therefore the region where the rear section region 66R of the single piece of cloth 66 configuring the diffuser 72 and the outer cloth 24 and the inner cloth 26 overlap with each other can be reduced, leading to a reduction in weight of the side airbag 16 and a smaller folded dimension (package dimension) of the side airbag 16.

In FIG. 9, the non-return valve 74 is positioned to permit the flow of gas ejected from the gas ejection section 18A of the inflator 18 from the upper chamber 32 towards the lower chamber 28 in the arrow A direction, and to restrict the flow of gas in the reverse direction. The non-return valve 74 configures the first opening section 72A as an opening section on the lower chamber 28 side of the diffuser 72 by opening and closing according to the flow of gas. In other words, the diffuser 72 is flexible, and is configured to also serve as the non-return valve 74 by the first opening section 72A opening and closing.

The non-return valve 74 (the first opening section 72A of the diffuser 72) is configured so as to open with the pressure of gas ejected from the gas ejection section 18A of the inflator 18 when the inflator 18 is actuated. The non-return valve 74 (the first opening section 72A of the diffuser 72) is configured so as to close when gas ejection from the inflator 18 has ended by gas from the high pressure chamber lower chamber 28 side attempting to flow in reverse to the low pressure chamber upper chamber 32 side.

Figure 12:
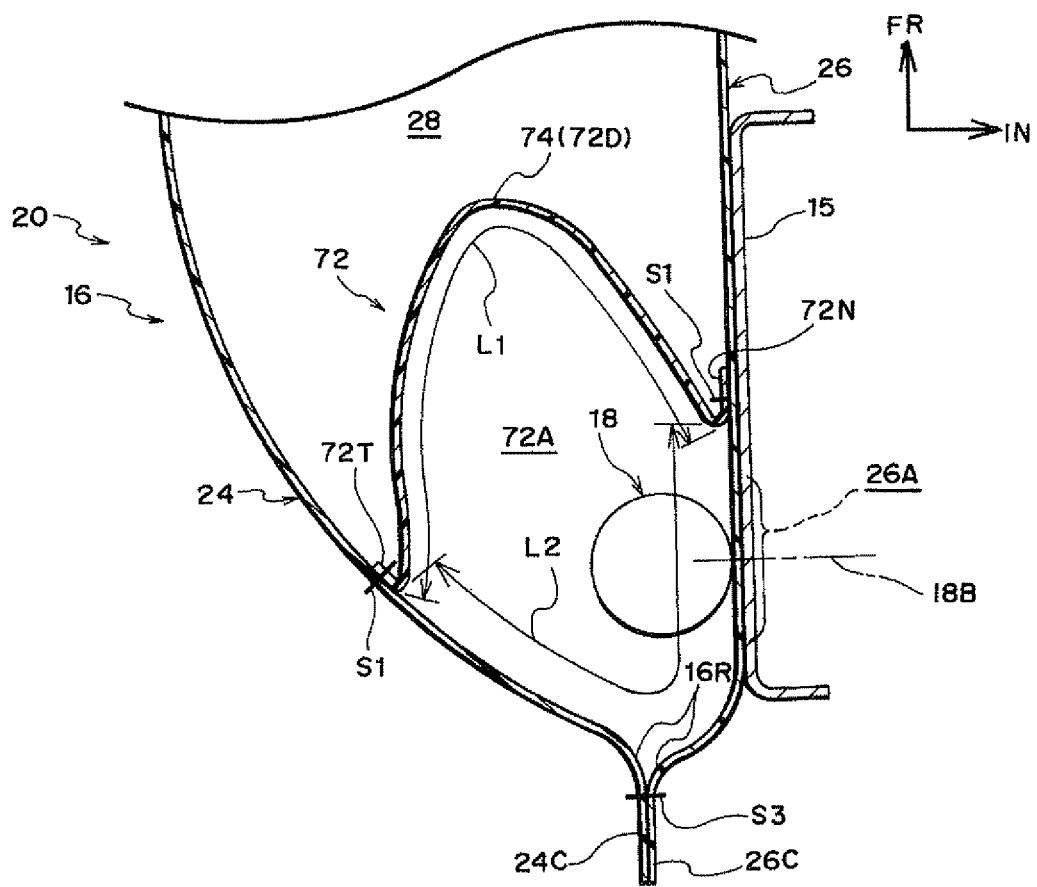

More specifically, the non-return valve 74 is configured by a bottom edge portion 72D of the diffuser 72 and a rear side inner face 16R of the side airbag 16. The non-return valve 74 opens when the bottom edge portion 72D separates from the rear side inner face 16R, and closes when the bottom edge portion 72D makes contact with the rear side inner face 16R. In FIG. 12 the vicinity of the stitched section S3 as viewed from the bag inside is the rear side inner face 16R of the side airbag 16.

As shown in FIG. 12, a length L1 along the cross-sectional profile of the non-return valve 74 from the stitched section S1 on the vehicle width direction outside as far as the stitched section 51 on the vehicle width direction inside, is set so as to be longer than a length L2 along the cross-sectional profile of the outer cloth 24 and the inner cloth 26 from the stitched section S1 on the vehicle width direction outside, via the rear side inner face 16R of the side airbag 16, as fax as the stitched section S1 on the vehicle width direction outside.

Accordingly, when gas is ejected from the inflator 18, the bottom edge portion 72D of the diffuser 72 separates from the rear side inner face 16R of the side airbag 16 due to the gas pressure, so as to open the non-return valve 74. Gas is accordingly permitted to flow from the upper chamber 32 side towards the lower chamber 28 side (the arrow A direction). The gas ejected from the inflator 18 is thereby also distributed to the upper chamber 32 through the second opening section 7213 of the diffuser 72 (the arrow B direction).

However when gas ejection from the inflator 18 has ended and gas attempts to flow in reverse from the high pressure chamber lower chamber 28 side to the low pressure chamber upper chamber 32 side, the bottom edge portion 72D of the diffuser 72 makes close contact with the rear side inner face 16R of the side airbag 16, so as to close the non-return valve 74. Reverse flow of gas can accordingly be restricted.

Other portions are similar to those of the first exemplary embodiment, and similar portions are accordingly allocated the same reference numerals in the drawings and further explanation is omitted thereof.

Modified Examples

Figure 13:
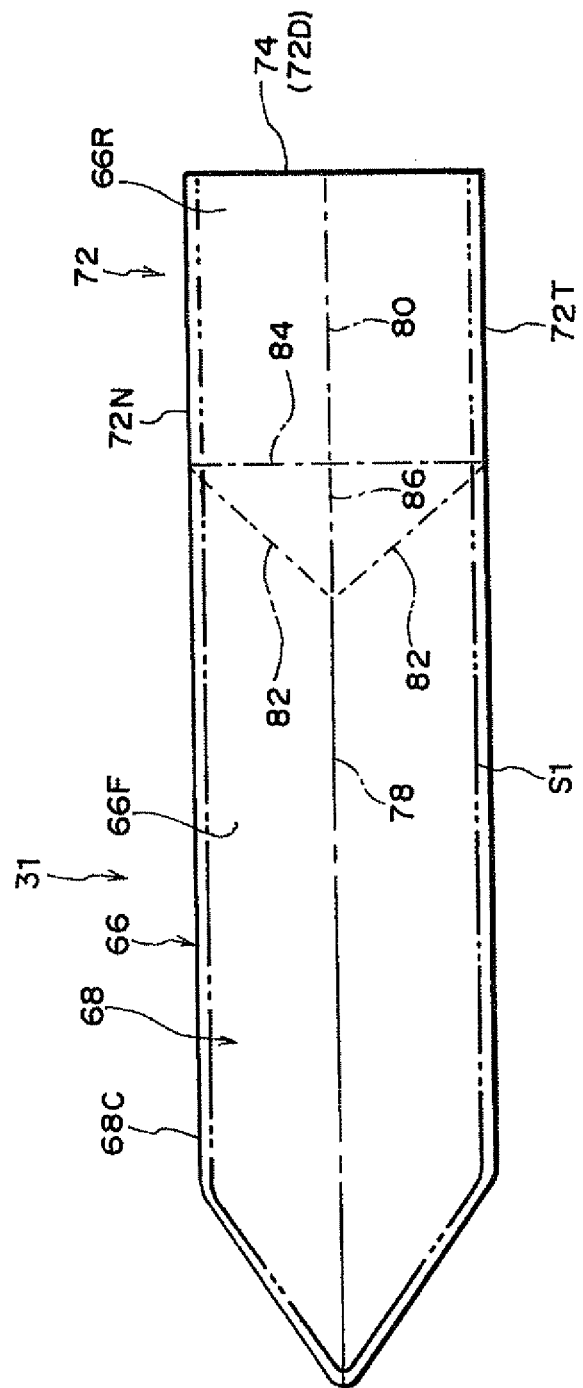
Figure 14:
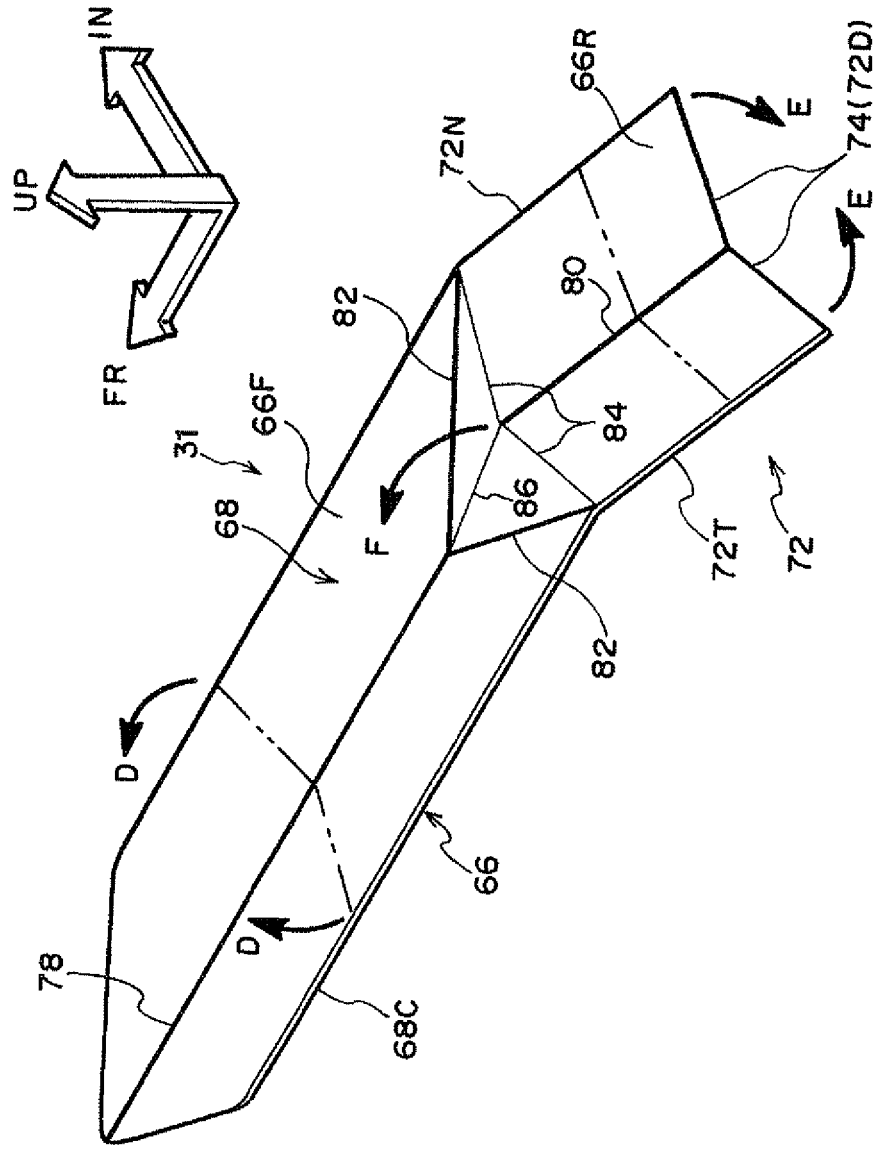
Figure 15:
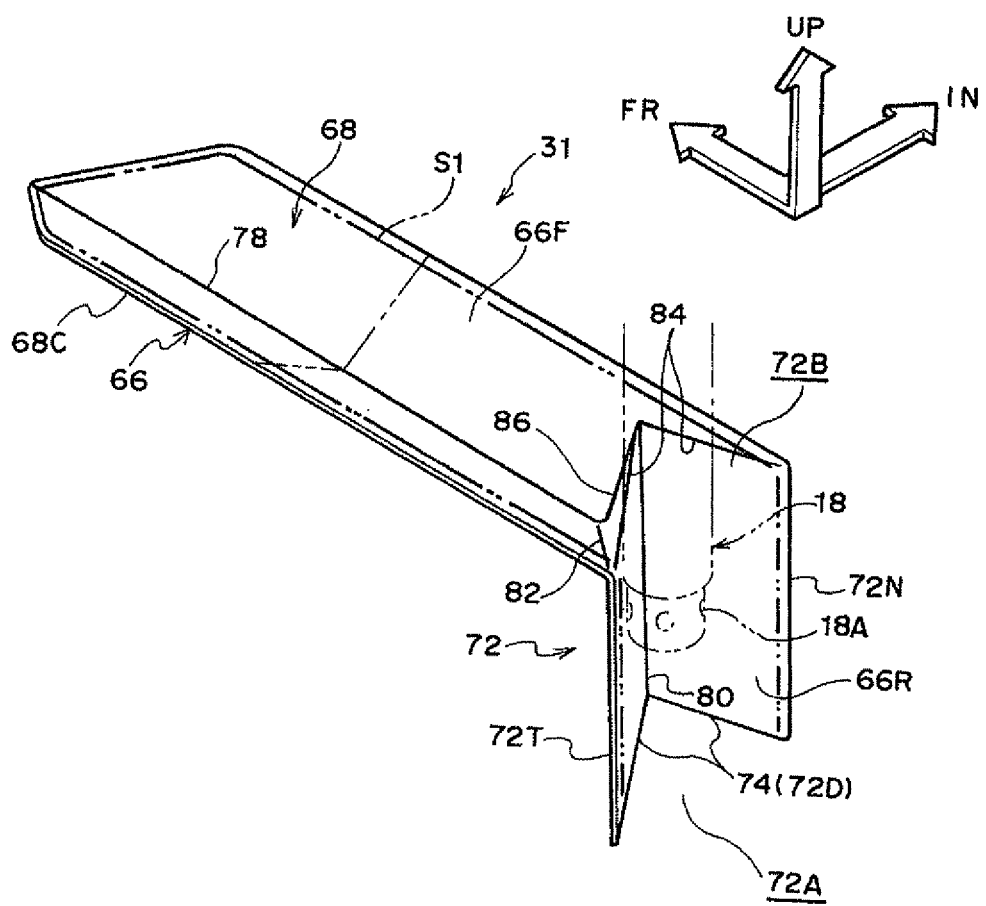

In FIG. 13 to FIG. 15, in a partitioning member 31 according to a modified example, a partitioning wall 68 is formed by folding a front region 66F of a single piece of cloth 66 in two (a valley fold) in the arrow D directions centered on a fold line 78, so as to protrude towards the lower chamber 28 side (FIG. 9), namely towards the seat bottom side. A diffuser 72 of the partitioning member 31 is also formed by folding a rear region 66R of the single piece of cloth 66 in two (a valley fold in the arrow E directions) projecting towards the seat front side centered on a fold line 80, and also folding so as to form a protrusion towards the seat top side at the position of a fold line 84 and a protrusion towards the seat front side at the position of a fold line 86, and also folding in the arrow F direction so as to form a protrusion towards the seat bottom side at the position of a fold line 82.

Consequently, the partitioning member 31 can be integrally formed together with the partitioning wall 68, the diffuser 72 and the non-return valve 74 not only when the partitioning wall 68 is formed in a protrusion towards the seat top side, as shown in FIG. 11, but also when the partitioning wall 68 is formed in a protrusion towards the seat bottom side, as shown in FIG. 15.

Third Exemplary Embodiment

Figure 16:
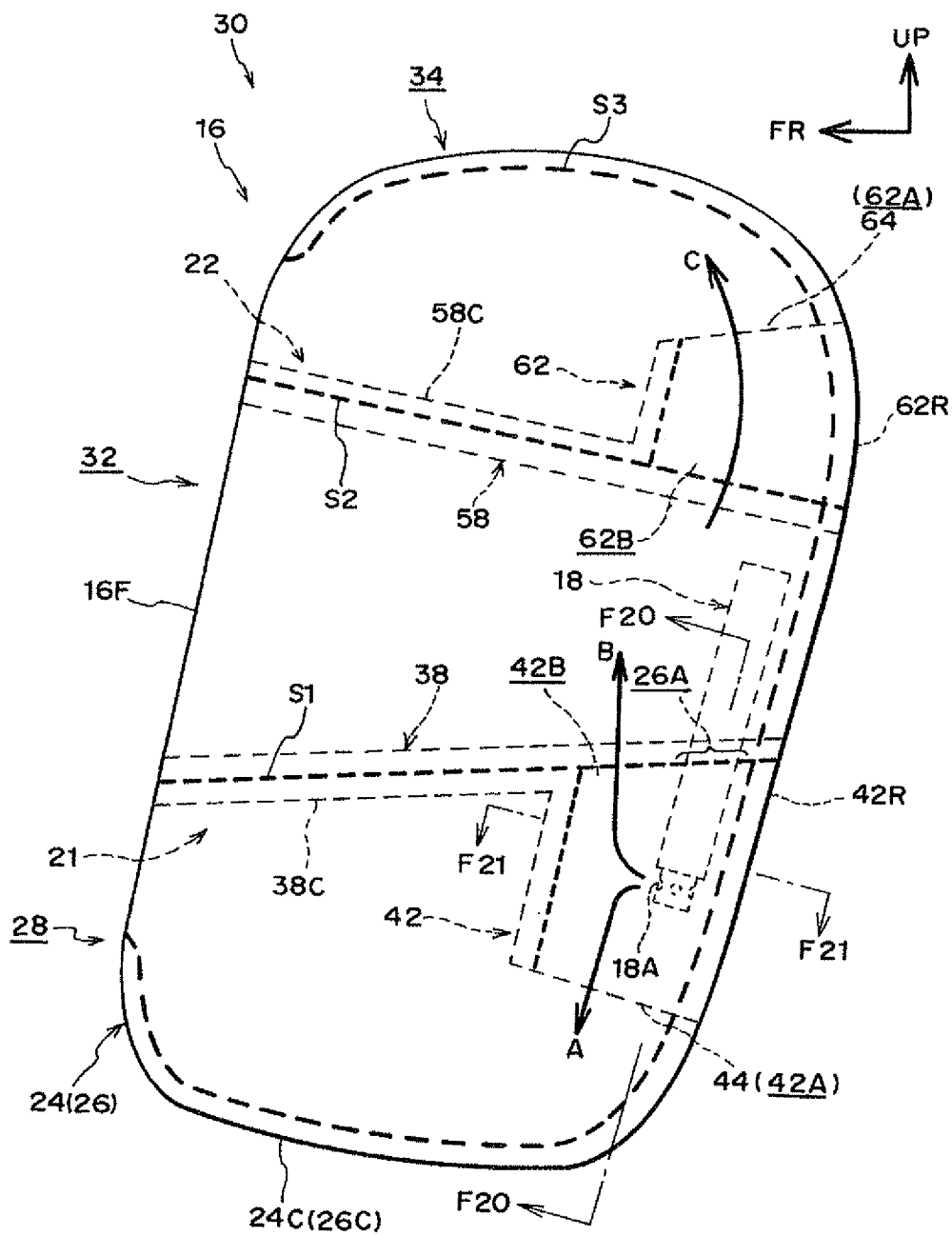
FIG. 16 to FIG. 21 relate to a third exemplary embodiment.

As shown in FIG. 16, a vehicle side airbag device 30 according to the present exemplary embodiment differs from the first exemplary embodiment in the structure of the partitioning members 21, 22. Explanation follows employing the partitioning member 21 as an example.

Figure 17:
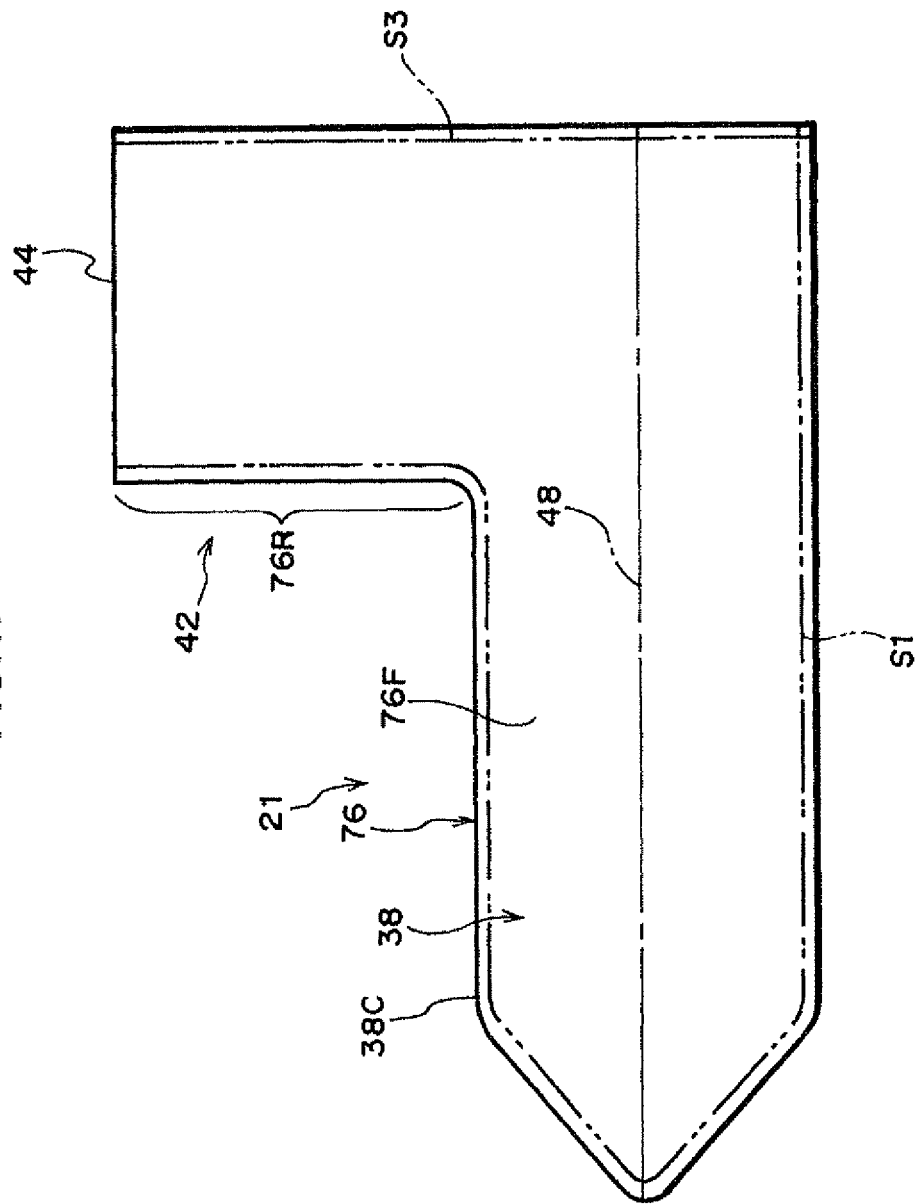

The partitioning member 21 is positioned at the boundary between the lower chamber 28 and the upper chamber 32, and is configured by a single piece of cloth 76. As shown in FIG. 17, the single piece of cloth 76 includes a base region 76F configuring a partitioning wall 38, and a projecting region 76R configuring a diffuser 42 that projects out to the seat width direction inside at a rear edge of the single piece of cloth 76. The single piece of cloth 76 is accordingly formed with a substantially L-shape when in the deployed state.

Figure 18:
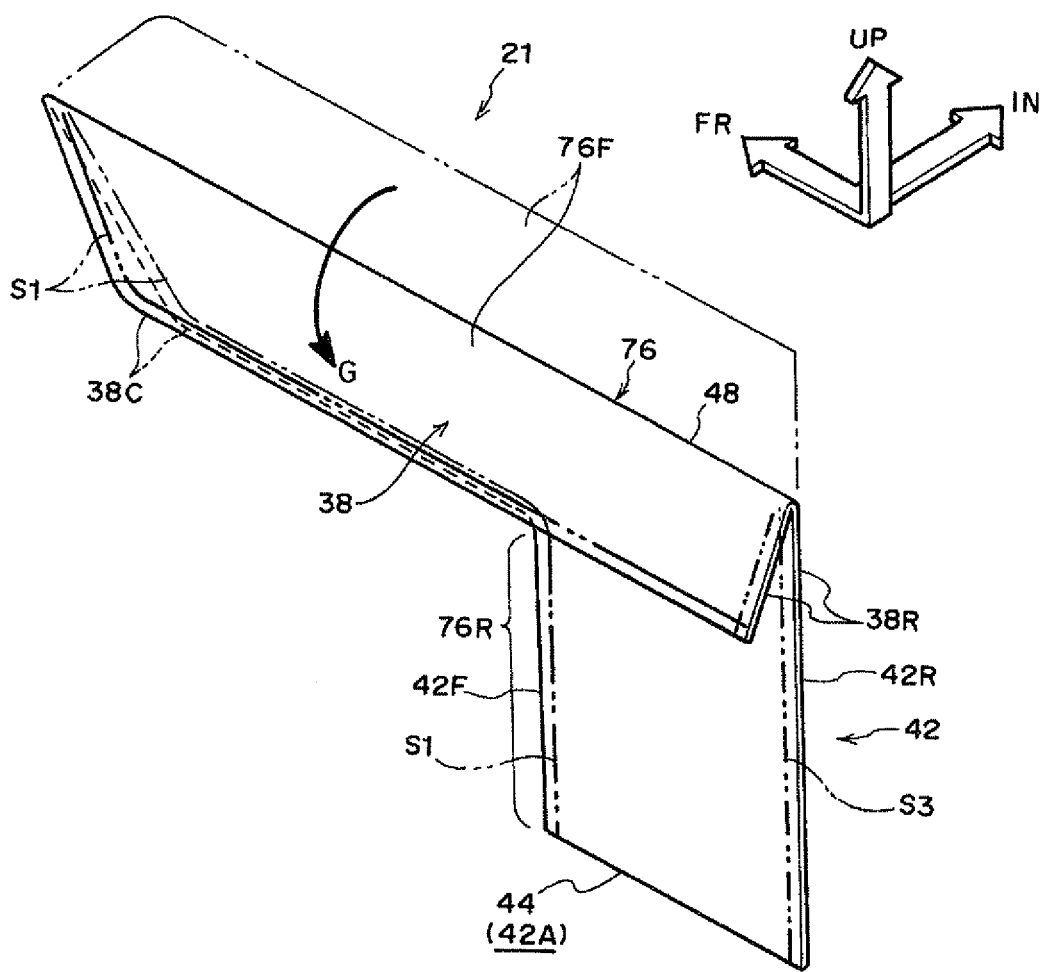

In FIG. 18, the partitioning wall 38 of the partitioning member 21 is formed by folding the base region 76F of the single piece of cloth 76 in two (a ridge fold) along an arrow G direction centered on a fold line 48, so as to project out towards the upper chamber 32 side (FIG. 16), namely towards the seat top side. The partitioning wall 38 is stitched at a peripheral edge portion 38C to the inner faces of an outer cloth 24 and an inner cloth 26 of the side airbag 16 (stitched section S1).

Figure 19:
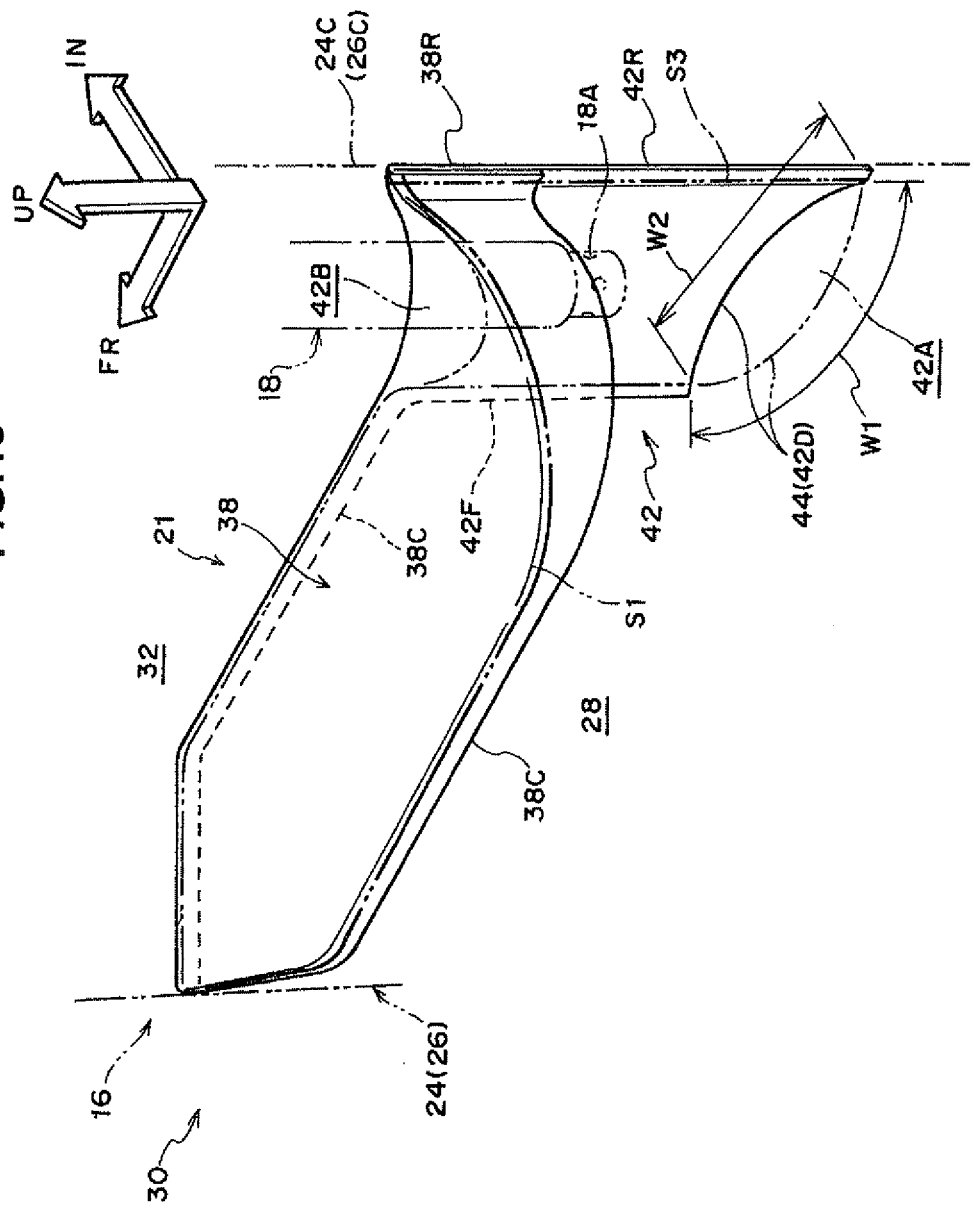
Figure 21:
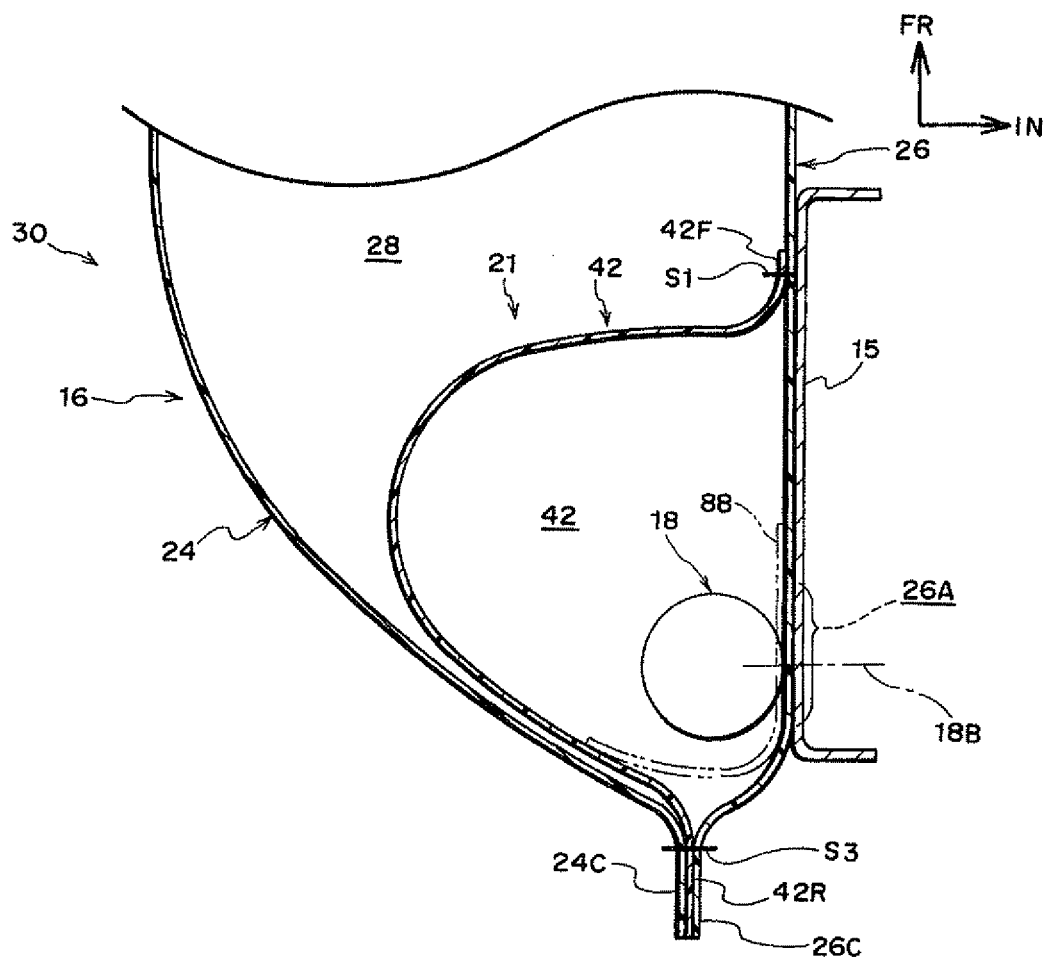

The diffuser 42 in the partitioning member 21 is formed with the partitioning wall 38 folded as described above, and the projecting region 76R is formed to give a state extending further to the lower chamber 28 (FIG. 16) side than the partitioning wall 38. As shown in FIG. 19 and FIG. 21, a front edge 42F of the diffuser 42 is stitched to the inner face of the inner cloth 26 (stitched section S1). Furthermore, the rear edge 38R of the partitioning wall 38 and rear edges 42R of the diffuser 42 are interposed between a peripheral edge portion 24C of the outer cloth 24 and a peripheral edge portion 26C of the inner cloth 26 and then stitched (stitched section S3).

In the present exemplary embodiment the diffuser 42 is configured such that not only the projecting region 76R of the single piece of cloth 76, but also a region of the inner cloth 26 facing towards the projecting region 76R, configures a portion of the diffuser 42. In other words, a gas flow path is formed through to the lower chamber 28 and the upper chamber 32 by the projecting region 76R of the single piece of cloth 76 and the region of the inner cloth 26 facing towards the projecting region 76R. Therefore the region where the projecting region 76R of the single piece of cloth 76 configuring the diffuser 42 overlaps with the inner cloth 26 is reduced, and not only can the weight of the side airbag 16 be reduced, but the folded dimension (the package dimension) of the side airbag 16 can also be made smaller.

Figure 20:
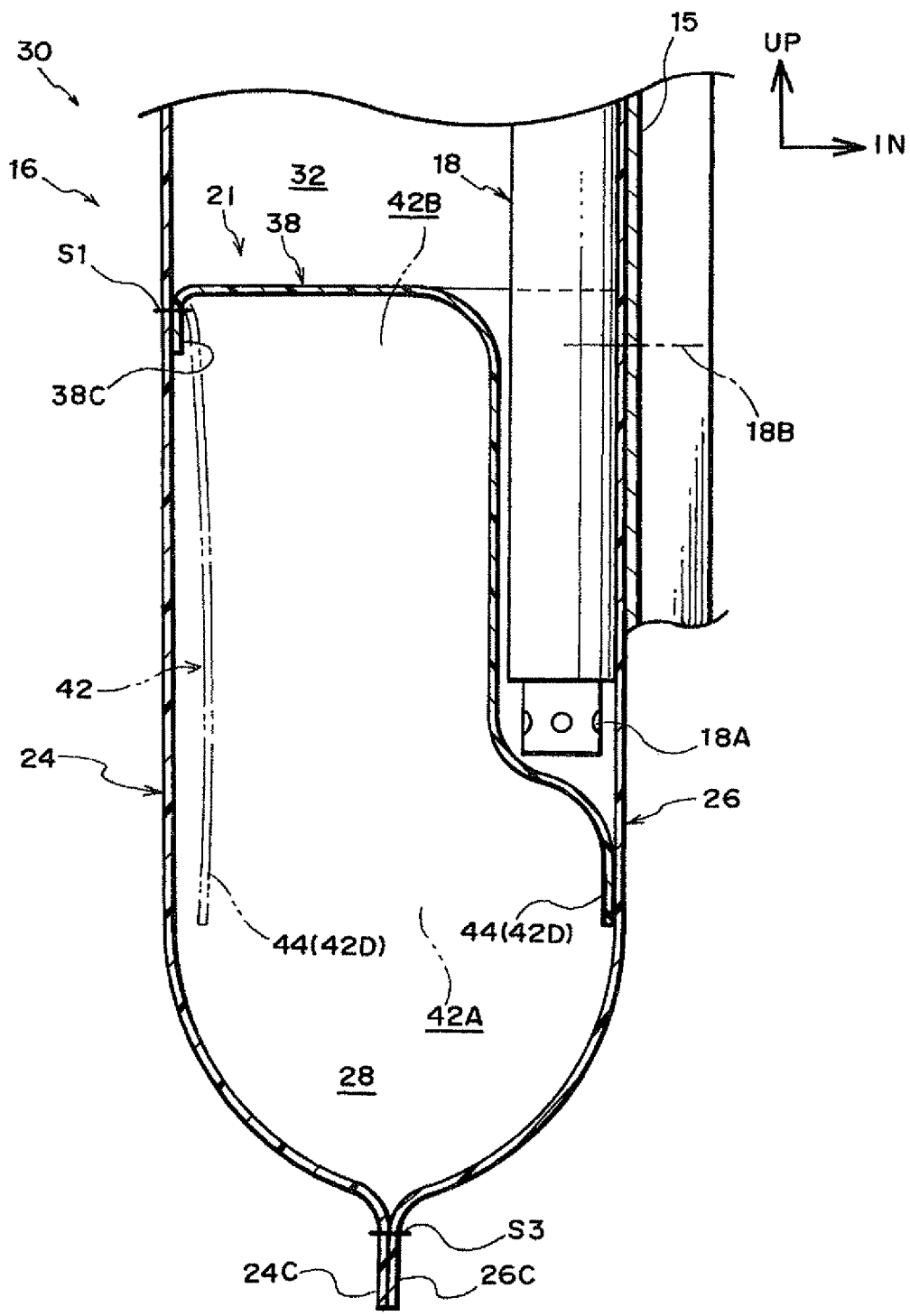

In FIG. 19 and FIG. 20, a non-return valve 44 of the partitioning member 21 is configured by a lower edge portion 42D of the diffuser 42 and the inner face of the inner cloth 26. The non-return valve 44 opens when the lower edge portion 42D separates from the inner face of the inner cloth 26 and closes when the lower edge portion 42D makes contact with the inner face.

A length W1 along the lower edge portion 42D from the stitched section S1 at the front edge 42F of the diffuser 42 as far as the stitched section S3 at the rear edge 42R of the diffuser 42 is set longer than a seat front-rear direction distance W2 between the stitched section S1 and the stitched section S3. Slack required for the non-return valve 44 to open and close can thereby be set in the lower edge portion 42D of the diffuser 42.

Therefore, as shown by the double-dashed intermittent lines in FIG. 19 and FIG. 20, the non-return valve 44 is configured to open by the lower edge portion 42D of the diffuser 42 separating from the inner face of the inner cloth 26 due to the pressure of gas when gas is ejected from the gas ejection section 18A of the inflator 18.

However, as shown by the solid lines in FIG. 19 and FIG. 20, when ejection of gas from the inflator 18 has ended and gas attempts to flow back from the high pressure chamber lower chamber 28 side to the low pressure chamber upper chamber 32 side, the non-return valve 44 closes by the lower edge portion 42D of the diffuser 42 making close contact with the inner face of the inner cloth 26.

In FIG. 21, the inflator 18 is inserted through the insertion hole 26A provided in the inner cloth 26 into the diffuser 42 inside the side airbag 16, namely inserted between the portion of the partitioning member 21 corresponding to the diffuser 42 and the inner cloth 26 itself. The inflator 18 is fixed to the seatback frame 15, and a seal cloth 88 and the location of the insertion hole 26A in the inner cloth 26 are nipped between the inflator 18 and the seatback frame 15. In the present exemplary embodiment, the seal cloth 88 is provided to raise the suppressing effect on gas outflow to outside the side airbag 16 since, unlike in the first exemplary embodiment (FIG. 8), there is no cloth of the diffuser 42 present between the inflator 18 and the seatback frame 15. Note that configuration may also be made without providing the seal cloth 88.

Other portions are similar to those of the first exemplary embodiment, and similar portions are accordingly allocated the same reference numerals in the drawings and further explanation is omitted thereof.

Fourth Exemplary Embodiment

Figure 22:
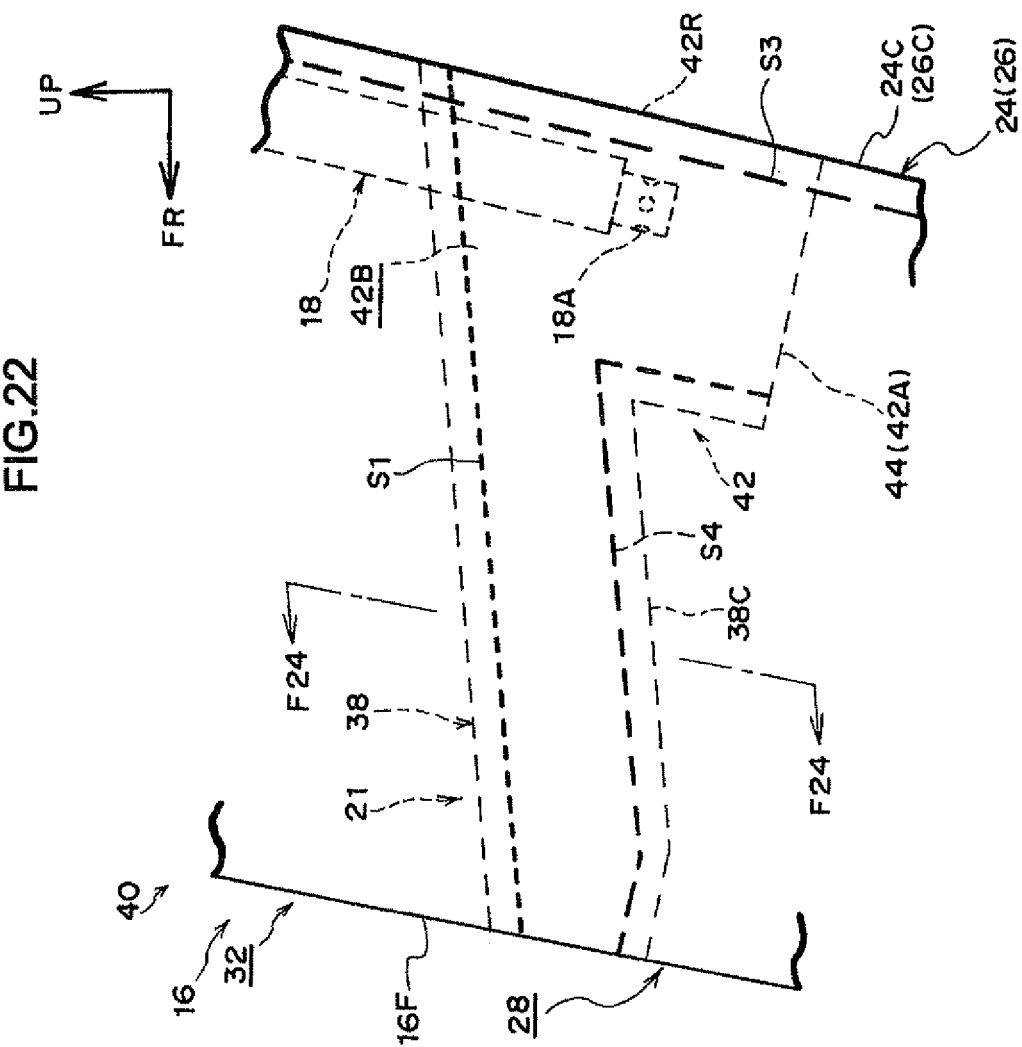
FIG. 22 to FIG. 25 relate to a fourth exemplary embodiment.
Figure 23:
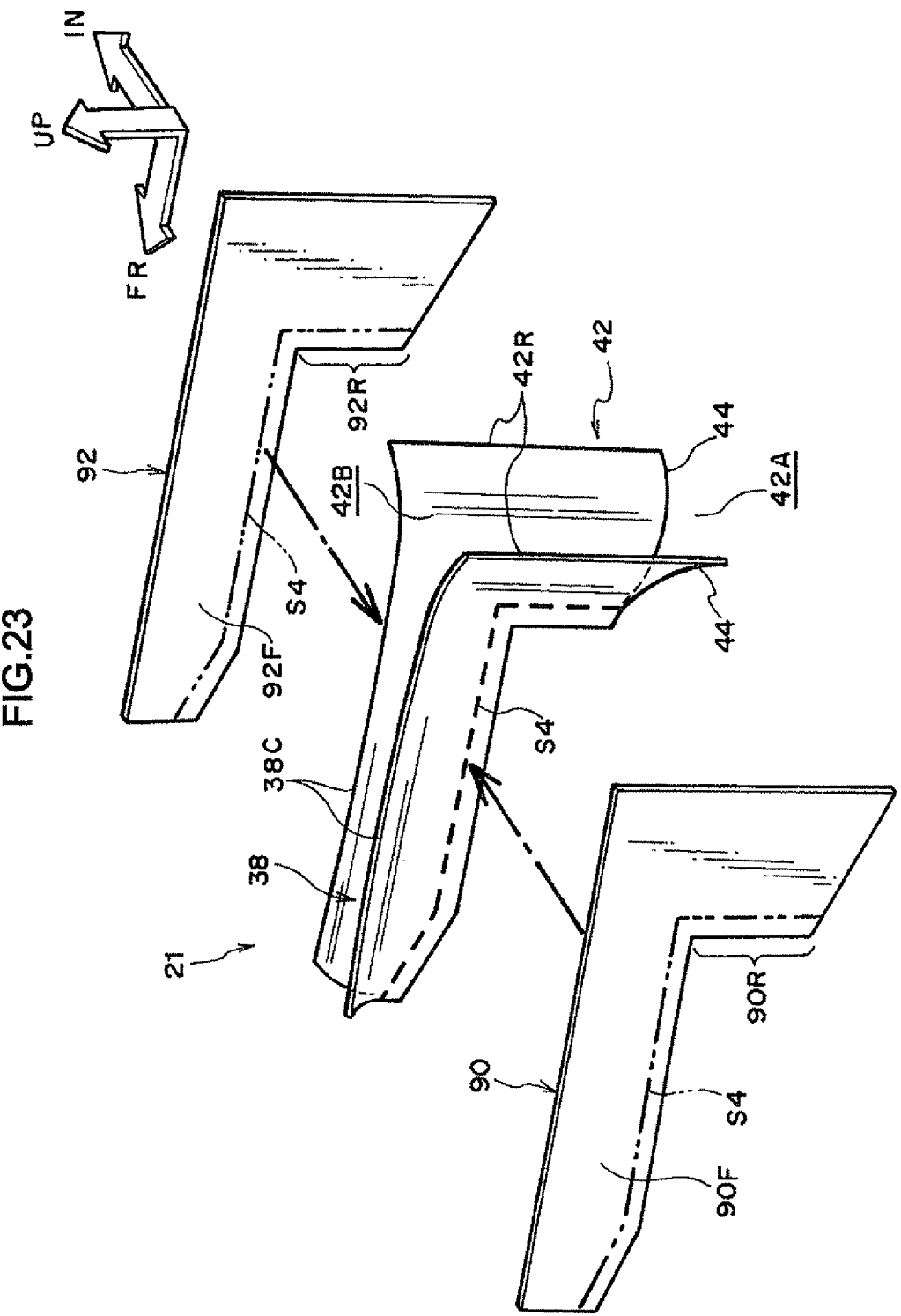

FIG. 22 shows a vehicle side airbag device 40 according to the present exemplary embodiment, configured with a partitioning member 21 partitioning between a lower chamber 28 and a upper chamber 32 inside the side airbag 16, configured by two cloths 90, 92 (FIG. 23) that have been joined together in advance. As shown in FIG. 23, the cloth 90 is a member positioned at the vehicle width direction outside, and the cloth 92 is a member positioned at the vehicle width direction inside.

The cloths 90, 92 include base regions 90F, 92F configuring a partitioning wall 38 of the partitioning member 21 and projecting regions 90R, 92R that project out to the lower chamber 28 side at the rear ends of the base regions 90F, 92F and configure a diffuser 42 of the partitioning member 21. The cloths 90, 92 are accordingly respectively formed with the same profile as each other, substantially L-shapes in side view. The cloths 90, 92 are joined together in advance by stitching (stitched section S4) the bottom edges of the base regions 90F, 92F and the front edges of the projecting regions 90R, 92R together prior to stitching to the side airbag 16.

Figure 24:
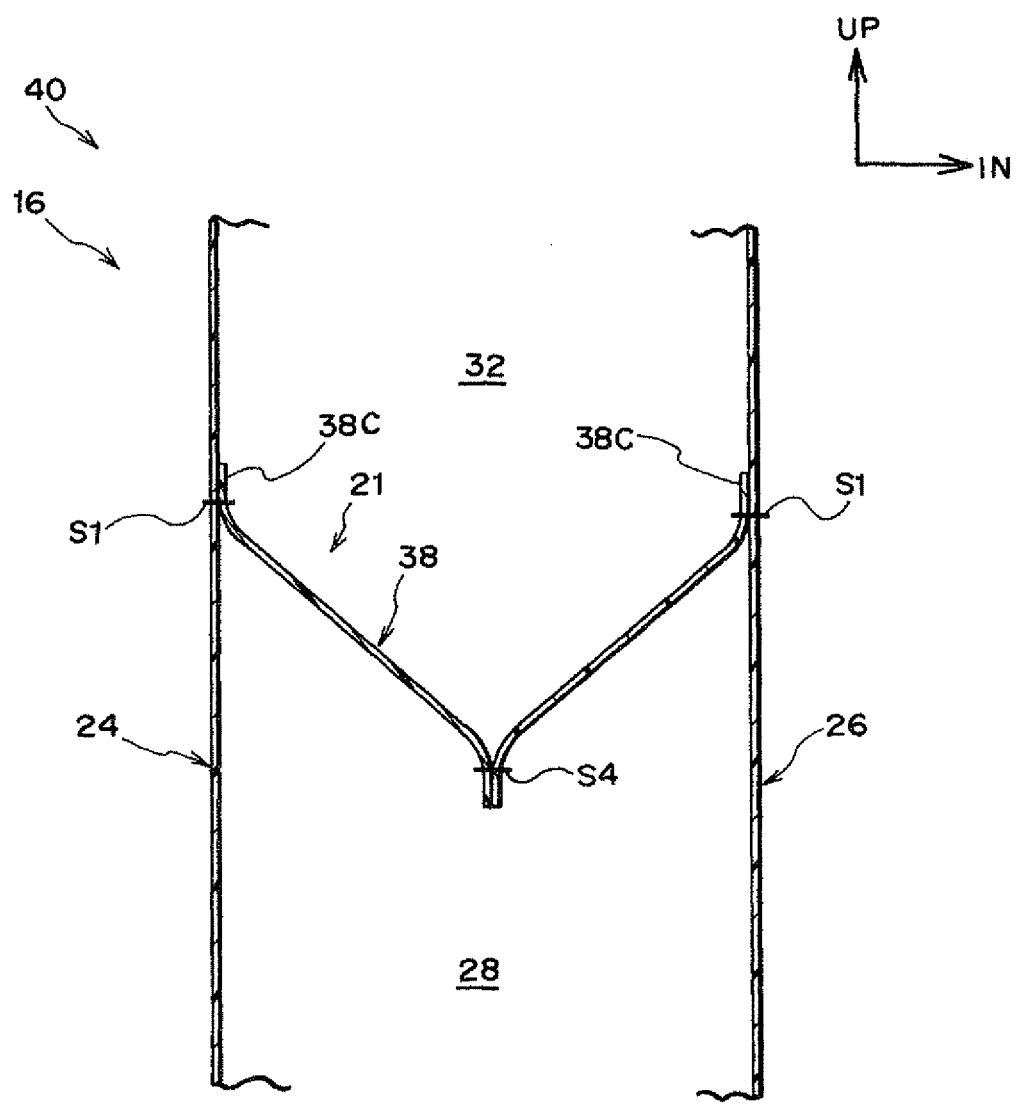

As shown in FIG. 22, the diffuser 42 of the partitioning member 21 is interposed between the peripheral edge portions 24C, 26C and stitched (stitched section S3). As shown in FIG. 24, the partitioning wall 38 of the partitioning member 21 is stitched at the peripheral edge portion 38C to the inner faces of the outer cloth 24 and the inner cloth 26 of the side airbag 16 (stitched section S1).

As described above, in the present exemplary embodiment, the partitioning member 21 is configured by the two pieces of cloth 90, 92 that have been integrated together in advance, and the partitioning wall 38, the diffuser 42 and the non-return valve 44 are provided to the partitioning member 21. Hence configuration can be simplified and a reduction in cost can also be achieved for the side airbag 16 with an interior partitioned into plural chambers.

Other portions are similar to those of the first exemplary embodiment, and similar portions are accordingly allocated the same reference numerals in the drawings and further explanation is omitted thereof.

Modified Example

Figure 25:
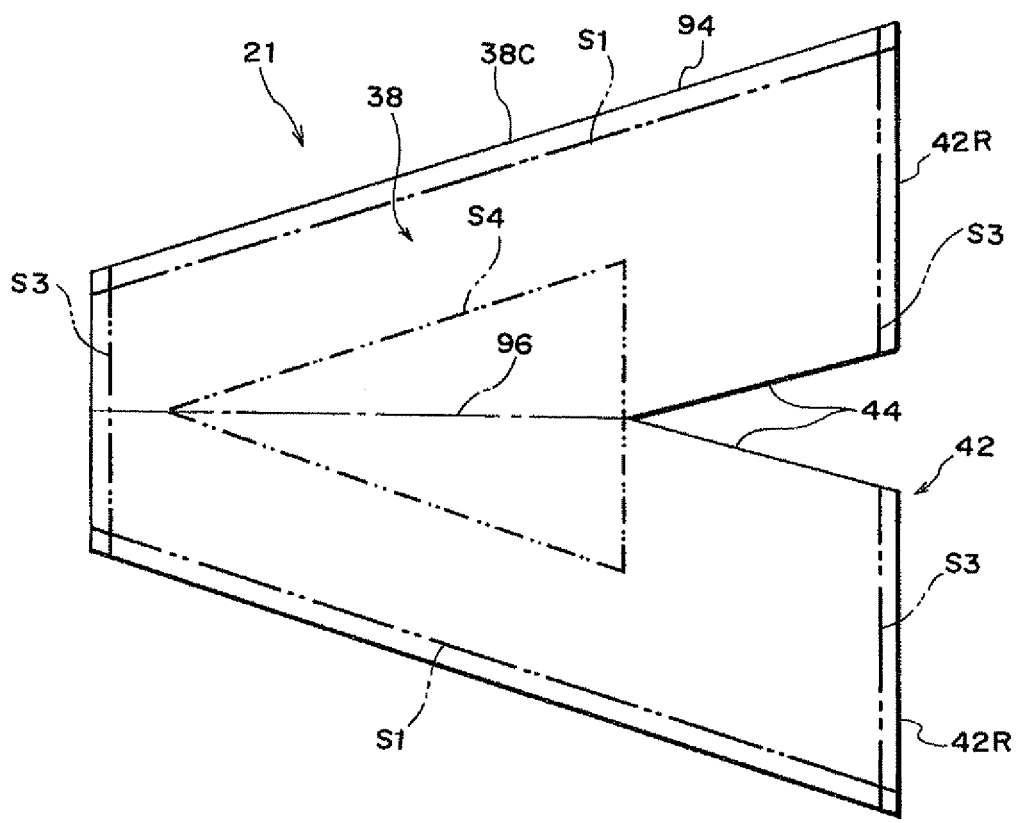

In FIG. 25 a partitioning member 21 according to a modified example is configured employing a single piece of cloth 94 formed with left-right symmetry in a substantially V-shape. More specifically, the single piece of cloth 94 is folded into two (a ridge fold or a valley fold) along a fold line 96, and the single piece of cloth 94 is configured integrally formed with a partitioning wall 38 and diffuser 42 by stitching together at a stitched section S4. The profile of the partitioning member 21 in side view is substantially the same as the profile of the partitioning member 21 shown in FIG. 22, however the modified example differs from the partitioning member 21 shown in FIG. 22 in that a portion surrounded by the stitched section S4 shown in FIG. 25 remains. Note that configuration may also be made with the portion surrounded by the stitched section S4 removed as appropriate. By removing portions not required of the partitioning member 21 the folded dimension of the side airbag 16 (the package dimension) can be made smaller.

Fifth Exemplary Embodiment

Figure 26:
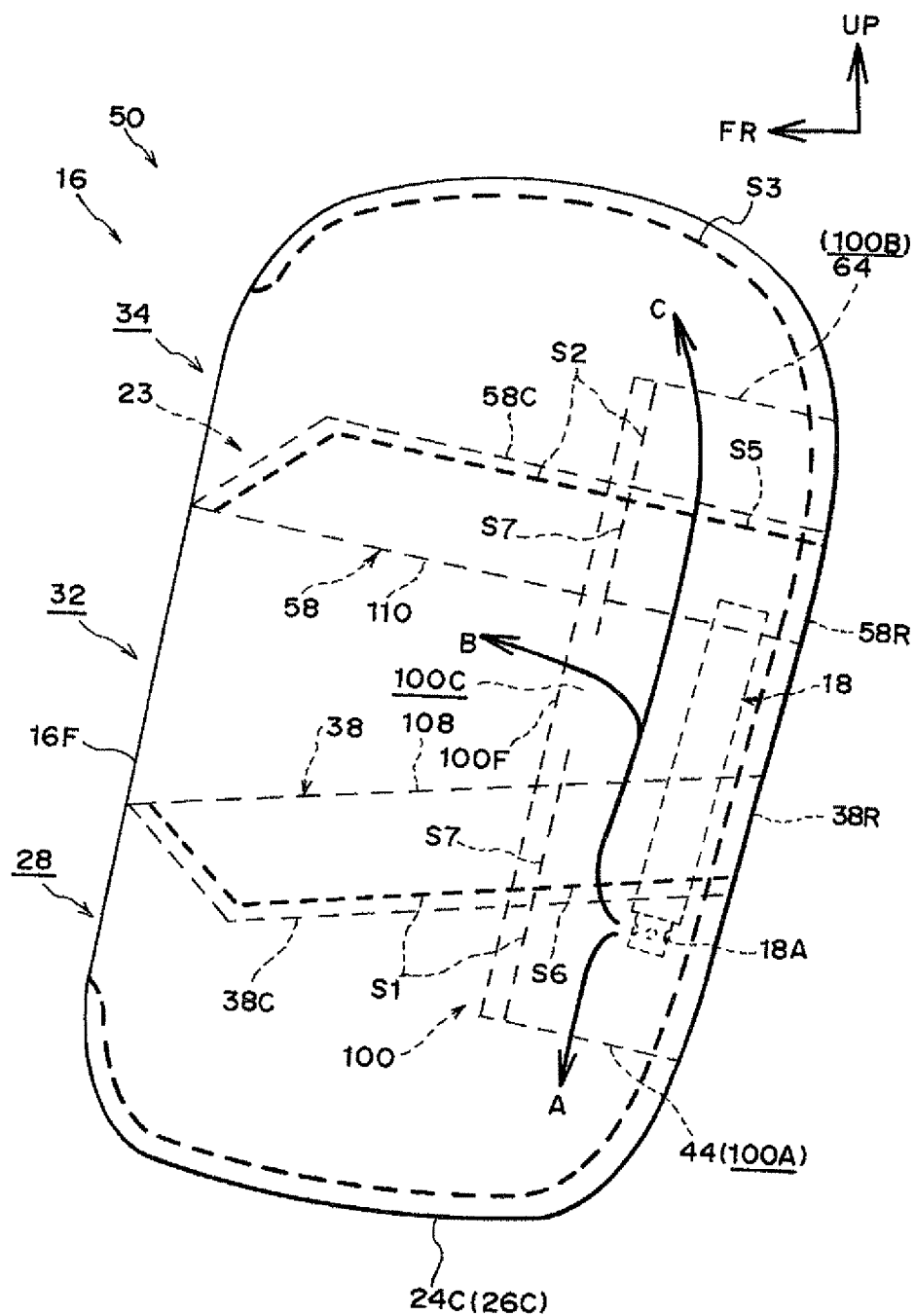
FIG. 26 and FIG. 27 relate to a fifth exemplary embodiment.
Figure 27:
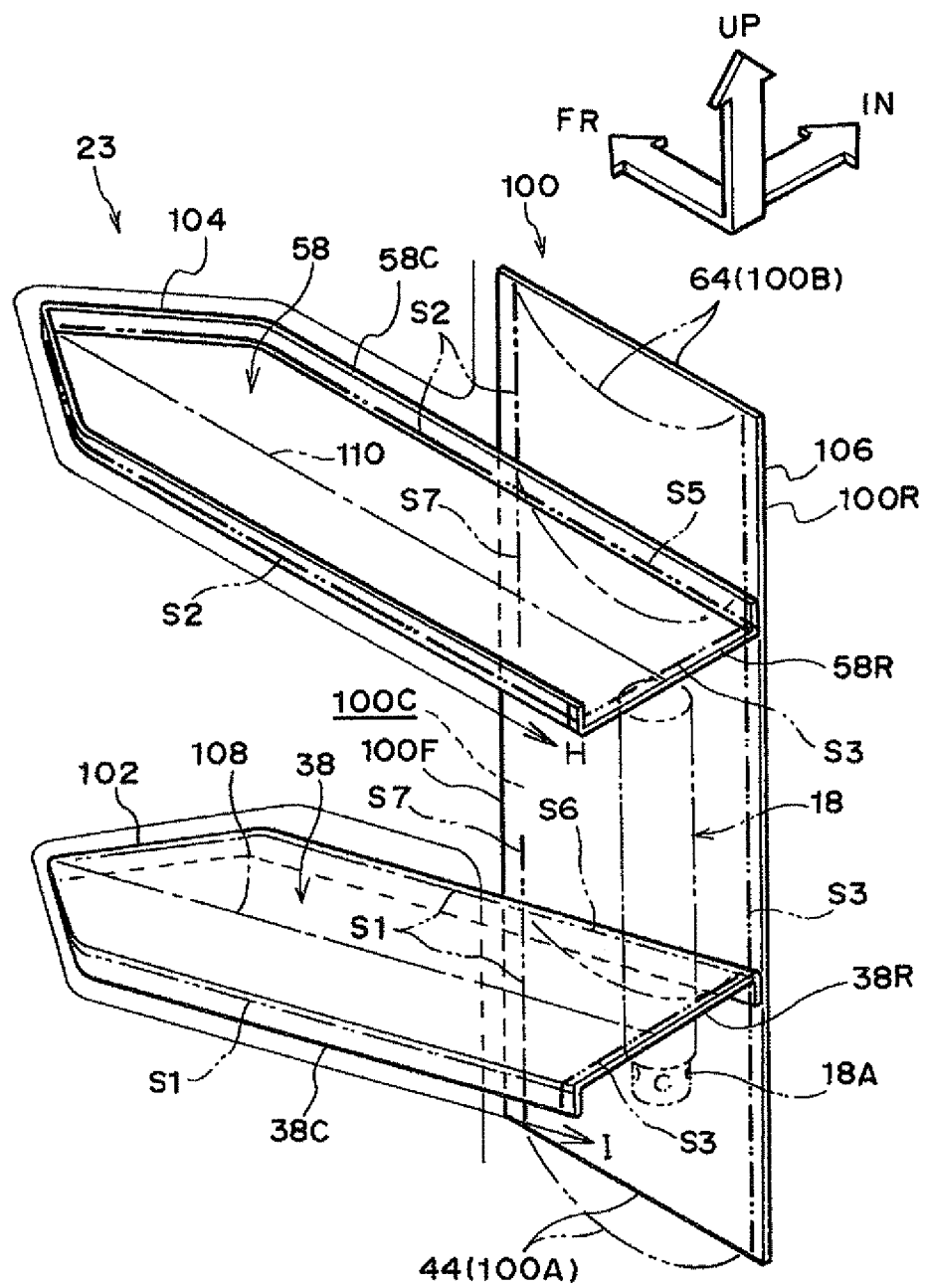

In a vehicle side airbag device 50 according to the present exemplary embodiment shown in FIG. 26 and FIG. 27, a partitioning member 23 is configured with for example three pieces of cloth 102, 104, 106 that have been integrated together in advance. The cloth 102 configures a lower side partitioning wall 38 that partitions between a lower chamber 28 and an upper chamber 32. The cloth 104 configures an upper side partitioning wall 58 that partitions between an upper chamber 32 and an uppermost chamber 34. The cloth 106 configures a diffuser 100.

As shown in FIG. 27, the seat rear end direction portion of the cloth 104 configuring the upper side partitioning wall 58 is stitched to a top portion of the cloth 106. More specifically, a peripheral edge portion 58C on the vehicle width direction inside at the seat rear direction end portion of the partitioning wall 58, is stitched to the top portion of the cloth 106 configuring the diffuser 100 (stitched section S5). The seat rear direction end portion of the cloth 102 configuring the lower side partitioning wall 38 is stitched to a bottom portion of the cloth 106. More specifically, a peripheral edge portion 38C on the vehicle width direction inside at the seat rear direction end portion of the partitioning wall 38 is stitched to a bottom portion of the cloth 106 (stitched section S6).

The partitioning member 23 configured by the three pieces of cloth 102, 104, 106 that have been integrated together in advance is then, for example, stitched to the outer cloth 24 and the inner cloth 26 of the side airbag 16.

First a top portion of a front edge 100F of the diffuser 100 is stitched to the inner cloth 26 and the peripheral edge portion 58C of the partitioning wall 58 is stitched to the inner cloth 26 and the outer cloth 24 (stitched section S2). The stitching at the stitched section S2 can be performed continuously along the arrow H direction. The top portion of the front edge 100F of the diffuser 100 refers to the portion from the height position of the stitched section S5 to the top edge of the front edge 100F.

Then a bottom portion of the front edge 100F of the diffuser 100 is stitched to the inner cloth 26 and a peripheral edge portion 38C of the partitioning wall 38 is stitched to the inner cloth 26 and the outer cloth 24 (stitched section S1). The stitching at the stitched section S1 can be performed continuously along the arrow I direction. The bottom portion of the front edge 100F of the diffuser 100 refers to the portion from the height position of the stitched section S6 to the bottom edge of the front edge 100F.

The portion of the front edge 100F of the diffuser 100 positioned between the partitioning walls 38, 58 is also stitched to the inner cloth 26, however stitching is partially omitted in order to provide a third opening section 100C opening to the upper chamber 32 (stitched section S7).

By stitching the partitioning member 23 to the outer cloth 24 and the inner cloth 26 as described above, the diffuser 100 is formed with a first opening section 100A opening to the lower chamber 28, a second opening section 100B opening to the uppermost chamber 34 and the third opening section 100C opening to the upper chamber 32. As shown in FIG. 26, the inflation gas when the inflator 18 is actuated is distributed through the first opening section 100A of the diffuser 100 to the lower chamber 28 of the side airbag 16 (arrow A direction), is also distributed through the second opening section 100B to the uppermost chamber 34 (arrow C direction), and is also distributed through the third opening section 100C to the upper chamber 32 (arrow B direction).

The amount of gas supplied to each of the chambers can be controlled by the ratio of opening surface areas for each opening portion, and the size of the third opening section 100C can be set by the length of the stitched section S7. The length of the stitched section S7 is appropriately set according to the distribution proportions for gas to be supplied to the lower chamber 28, the upper chamber 32 and the uppermost chamber 34, and is not limited to the example illustrated.

When the length from the partitioning wall 58 to the top edge of the diffuser 100 (a non-return valve 64) and the length from the partitioning wall 38 to the bottom edge of the diffuser 100 (a non-return valve 44) is reduced, the resistance to passage of gas is reduced, and a greater proportion of gas can be distributed to the lower chamber 28 and the uppermost chamber 34. In such cases, supply of gas to the low pressure chamber upper chamber 32 can be suppressed even if the opening surface area of the third opening section 100C is large, and so the stitched section S7 can be omitted, and the number of processes for manufacturing the side airbag 16 can be reduced.

The supply of gas to the upper chamber 32 can be suppressed by making the separation intervals between the partitioning walls 38, 58 narrower in side view with respect to the opening width of the first opening section 100A and the second opening section 100E of the diffuser 100. The length of the stitched section S7 can accordingly be made shorter, or the stitched section S7 can be omitted altogether.

The rear edges 38R, 58R of the partitioning wall 38 and the partitioning wall 58 and the rear edge 100R of the diffuser 100 are respectively folded in two (a ridge fold and valley fold), placed in a state interposed between the outer cloth 24 and the peripheral edge portions 24C, 26C of the inner cloth 26 and then stitched (stitched section S3). When this is performed, the partitioning wall 38 is folded to project towards the seat top side centered on a fold line 108, and the partitioning wall 58 is folded to project towards the seat bottom side centered on a fold line 110 (see FIG. 26).

Other portions are similar to those of the first exemplary embodiment, and similar portions are accordingly allocated the same reference numerals in the drawings and further explanation is omitted thereof.

Other Exemplary Embodiments

Note whereas in the first exemplary embodiment, the third exemplary embodiment and the fifth exemplary embodiment, the side airbag 16 has a three chamber structure, there is no limitation thereto and configuration may be made with a two chamber structure. Whereas in the second exemplary embodiment and the fourth exemplary embodiment the side airbag 16 has a two chamber structure there is no limitation thereto and configuration may be made with a three chamber structure.

The vehicle side airbag devices 10, 20, 30, 40, 50 according to the respective exemplary embodiments are not limited to airbag devices installed in the vehicle seat 12, and they may, for example, be installed inside a trim in a vehicle side section.

EXPLANATION OF THE REFERENCE NUMERALS

10 Vehicle side airbag device
12 Vehicle seat
14 Seatback
15 Seatback frame
16 Side airbag
18 Inflator
18A Gas ejection section
20 Vehicle side airbag device
21 Partitioning member
22 Partitioning member
23 Partitioning member
24 Outer cloth
24C Peripheral edge portion
26 Inner cloth
26A Insertion hole
26C Peripheral edge portion
28 Lower chamber (high pressure chamber)
30 Vehicle side airbag device
31 Partitioning member
32 Upper chamber (low pressure chamber)
34 Uppermost chamber (high pressure chamber)
36 Occupant
36C Chest region
36S Shoulder region
36W Waist region
38 Partitioning wall
40 Vehicle side airbag device
42 Diffuser
44 Non-return valve
46 Single piece of cloth
50 Vehicle side airbag device
58 Partitioning wall
62 Diffuser
64 Non-return valve
66 Single piece of cloth
68 Partitioning wall
72 Diffuser
74 Non-return valve
76 Single piece of cloth
90 Cloth
92 Cloth
94 Single piece of cloth
100 Diffuser
102 Cloth
104 Cloth
106 Cloth

The invention claimed is:
1. A vehicle side airbag device comprising:
a side airbag configured in a bag shape by an outer cloth positioned at a vehicle width direction outside and an inner cloth positioned at a vehicle width direction inside, the side airbag comprising one or more high pressure chambers on a high pressure side during inflation and deployment and a low pressure chamber that is at lower pressure than the one or more high pressure chambers during inflation and deployment, the side airbag inflating and deploying to the side of an occupant seated in a vehicle seat when a side-on collision occurs;

an inflator that ejects inflation gas from a gas ejection section and supplies the gas into the side airbag during a side-on collision; and a partitioning member that is provided between the outer cloth and the inner cloth, is configured by a single piece of cloth, and comprises a partitioning wall that partitions between the one or more high pressure chambers and the low pressure chamber, a diffuser that mainly distributes gas ejected from the gas ejection section of the inflator to the high pressure chamber side and also distributes gas to the low pressure chamber side, and a non-return valve that permits gas to flow from the low pressure chamber side to the high pressure chamber side and restricts gas from flowing in a reverse direction, wherein:

the partitioning wall is positioned at a vehicle seat front side of the partitioning member and is formed by folding the partitioning member so as to project towards the low pressure chamber side or towards the high pressure chamber side;

the diffuser is positioned at a seat rear side of the partitioning member and is formed by folding the partitioning member to project towards the seat front side so as to extend further to the high pressure chamber side than a height position of the partitioning wall; and the non-return valve is formed as an opening section on the high pressure chamber side of the diffuser and opens and closes according to the flow of gas.

2. The vehicle side airbag device of claim 1, wherein a pair of rear edges of the diffuser are interposed between a peripheral edge portion of the outer cloth and a peripheral edge portion of the inner cloth and stitched.

3. The vehicle side airbag device of claim 1, wherein a rear edge positioned at the vehicle width direction outside of the diffuser is stitched to a side portion of the outer cloth, and a rear edge positioned at the vehicle width direction inside of the diffuser is stitched to a side portion of the inner cloth.

4. The vehicle side airbag device of claim 1, wherein in the inflated and deployed state of the side airbag:

the one or more high pressure chambers include a lower chamber configured to be aligned with a waist region of the occupant; and the low pressure chamber is an upper chamber configured to be aligned with at least one of a chest region or a shoulder region of the occupant.

5. The vehicle side airbag device of claim 1, wherein in the inflated and deployed state of the side airbag:

the one or more high pressure chambers comprise a lower chamber configured to be aligned with a waist region of the occupant and an uppermost chamber configured to be aligned with a shoulder region of the occupant; and the low pressure chamber is an upper chamber positioned between the uppermost chamber and the lower chamber and is configured to be aligned with a chest region of the occupant.

6. The vehicle side airbag device of claim 1, wherein:

an insertion hole for inserting the inflator inside the side airbag is provided at a location in the inner cloth overlapping with the diffuser; and the inflator is inserted into the side airbag through the insertion hole, and the inflator is fixed to a seatback frame such that the location of the insertion hole in the inner cloth and the diffuser are nipped between the inflator and the seatback frame of the vehicle seat seatback.

* * * * *